US011483888B1

(12) United States Patent
Shen et al.

(10) Patent No.: US 11,483,888 B1
(45) Date of Patent: Oct. 25, 2022

(54) RANDOM ACCESS CHANNEL PROCEDURE BASED RADIO ACCESS TECHNOLOGY DISPLAY INDICATION

(71) Applicant: QUALCOMM Incorporated, San Diego, CA (US)

(72) Inventors: Liping Shen, San Diego, CA (US); Sharda Ranjan, Hyderabad (IN); Sree Harsha Boducharla, Hyderabad (IN); Naga Chandan Babu Gudivada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/302,345

(22) Filed: Apr. 30, 2021

(51) Int. Cl.
*H04W 76/16* (2018.01)
*H04W 74/08* (2009.01)
*H04W 76/18* (2018.01)
*H04W 80/02* (2009.01)

(52) U.S. Cl.
CPC ....... *H04W 76/16* (2018.02); *H04W 74/0833* (2013.01); *H04W 76/18* (2018.02); *H04W 80/02* (2013.01)

(58) Field of Classification Search
CPC . H04W 76/16; H04W 74/0833; H04W 76/18; H04W 80/02
See application file for complete search history.

(56) References Cited

U.S. PATENT DOCUMENTS

| | | | |
|---|---|---|---|
| 2019/0007268 A1* | 1/2019 | Wager | H04L 41/0816 |
| 2020/0195620 A1* | 6/2020 | Ryoo | H04W 12/04 |
| 2021/0185745 A1* | 6/2021 | Chinnakkannu | H04W 8/20 |
| 2022/0078877 A1* | 3/2022 | Lee | H04W 76/27 |

* cited by examiner

Primary Examiner — Harry H Kim
(74) Attorney, Agent, or Firm — Harrity & Harrity LLP; Kevin M. Donnelly

(57) ABSTRACT

Various aspects of the present disclosure generally relate to wireless communication. In some aspects, a user equipment (UE) may receive, from a base station associated with a first radio access technology (RAT), an indication to add a secondary cell associated with a second RAT in a dual connectivity mode. The UE may receive, by a lower layer of the UE from the secondary cell, an indication that a random access channel (RACH) procedure associated with the secondary cell is successful. The UE may transmit, by an upper layer of the UE to an application of the UE, information to cause an indication of the second RAT to be displayed by the UE based at least in part on a bearer type associated with a link with the secondary cell and the indication that the RACH procedure with the secondary cell is successful. Numerous other aspects are provided.

30 Claims, 10 Drawing Sheets

RANDOM ACCESS CHANNEL PROCEDURE BASED RADIO ACCESS TECHNOLOGY DISPLAY INDICATION

FIELD OF THE DISCLOSURE

Aspects of the present disclosure generally relate to wireless communication and specifically, to techniques and apparatuses for enabling a random access channel (RACH) procedure based radio access technology (RAT) display indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some cases, a UE may display (for example, using a user interface of the UE) an indication of a radio access technology (RAT) that the UE is using, or is capable of using, for communications. For example, the UE may display an icon associated with a RAT that the UE is using, or is capable of using, for communication. In some examples, such as in a dual connectivity mode, the UE may display an icon of a RAT associated with a secondary cell or a secondary cell group (SCG). For example, in a dual connectivity mode, a master cell group (MCG) may anchor a network connection between the UE and a core network (for example, for mobility, coverage, or control plane information), and the SCG may be added as an additional carrier to increase throughput (for example, for data traffic or user plane information). In some cases, the RAT associated with the SCG may be associated with improved performance as compared to the RAT of an MCG (such as higher data rate, higher throughput, or improved communication efficiency, among other examples).

In some cases, an upper layer of the UE (for example, a data service layer) may detect that the MCG and the UE are both capable of supporting a second RAT in a dual connectivity mode. In some examples, the UE may display an indication of the second RAT (such as an NR RAT) using a user interface of the UE based on one or more conditions for enabling the UE to communicate using the second RAT having been satisfied. For example, the upper layer may report the second RAT to be displayed based on the UE being capable of supporting the second RAT, the MCG being capable of supporting the second RAT as an SCG, and a measurement event for a cell associated with the second RAT being satisfied. However, in some cases, the UE may be unable to establish a connection with the SCG. For example, the UE may attempt to perform a random access channel (RACH) procedure with the SCG, but the RACH procedure may fail. As a result, the upper layer may report the first RAT associated with the MCG to be displayed by the UE. In some cases, as the measurement event associated with the second RAT may still be satisfied (after the RACH failure), the UE may attempt to add the SCG again in a similar manner. As a result, the upper layer of the UE may cause an icon displayed by the UE to switch from an icon associated with the first RAT to an icon associated with the second RAT. In some cases, the UE may experience another RACH failure with the SCG. As a result, the upper layer of the UE may cause a RAT icon displayed by the UE to be switched from the icon associated with the second RAT to the icon associated with the first RAT. Therefore, the UE may experience frequent display changes (for example, a change in a RAT icon being displayed by the UE). This may negatively impact user perception of the UE (for example, as the frequent display changes for the RAT icon may result in a perception of poor performance). Moreover, the frequent display changes for the RAT icon being displayed by the UE may consume resources (such as processing resources) associated with reporting and changing the RAT icon being displayed by the UE frequently over a short period of time.

SUMMARY

Some aspects described herein provide a user equipment (UE) for wireless communication includes at least one processor and at least one memory communicatively coupled with the at least one processor and storing processor-readable code. In some aspects, the processor readable code, when executed by the at least one processor, is configured to cause the UE to receive, from a base station associated with a first radio access technology (RAT), an indication to add a secondary cell associated with a second RAT in a dual connectivity mode. In some aspects, the processor readable code, when executed by the at least one processor, may be configured to cause the UE to receive from the secondary cell, an indication that a random access channel (RACH) procedure associated with the secondary cell is successful. In some aspects, the processor readable code, when executed by the at least one processor, may be configured to cause the UE to transmit, to an application associated with a display of the UE, information to cause an indication of the second RAT to be displayed by the UE based at least in part on a bearer type associated with a link with the secondary cell and the indication that the RACH procedure with the secondary cell is successful.

Some aspects described herein provide a method of wireless communication performed by a UE. The method may include receiving, from a base station associated with a first RAT, an indication to add a secondary cell associated with a second RAT in a dual connectivity mode. The method may include receiving, by a lower layer of the UE, from the secondary cell, an indication that a RACH procedure associated with the secondary cell is successful. The method may include transmitting, by an upper layer of the UE and to an application associated with a display of the UE, information to cause an indication of the second RAT to be displayed by the UE based at least in part on a bearer type associated with a link with the secondary cell and the indication that the RACH procedure with the secondary cell is successful.

Some aspects described herein provide a non-transitory computer-readable medium storing a set of instructions includes one or more instructions. In some aspects, the one or more instructions, when executed by one or more processors of a UE, cause the UE to receive, from a base station associated with a first RAT, an indication to add a secondary cell associated with a second RAT in a dual connectivity mode. In some aspects, the one or more instructions, when executed by one or more processors of the UE, cause the UE to receive from the secondary cell, an indication that a RACH procedure associated with the secondary cell is successful. In some aspects, the one or more instructions, when executed by one or more processors of the UE, cause the UE to and transmit, to an application associated with a display of the UE, information to cause an indication of the second RAT to be displayed by the UE based at least in part on a bearer type associated with a link with the secondary cell and the indication that the RACH procedure with the secondary cell is successful.

Some aspects described herein provide an apparatus. The apparatus may include means for receiving, from a base station associated with a first RAT, an indication to add a secondary cell associated with a second RAT in a dual connectivity mode. The apparatus may include means for receiving, by a lower layer of the apparatus, from the secondary cell, an indication that a RACH procedure associated with the secondary cell is successful. The apparatus may include means for transmitting, by an upper layer of the apparatus to an application associated with a display of the apparatus, information to cause an indication of the second RAT to be displayed by the apparatus based at least in part on a bearer type associated with a link with the secondary cell and the indication that the RACH procedure with the secondary cell is successful.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
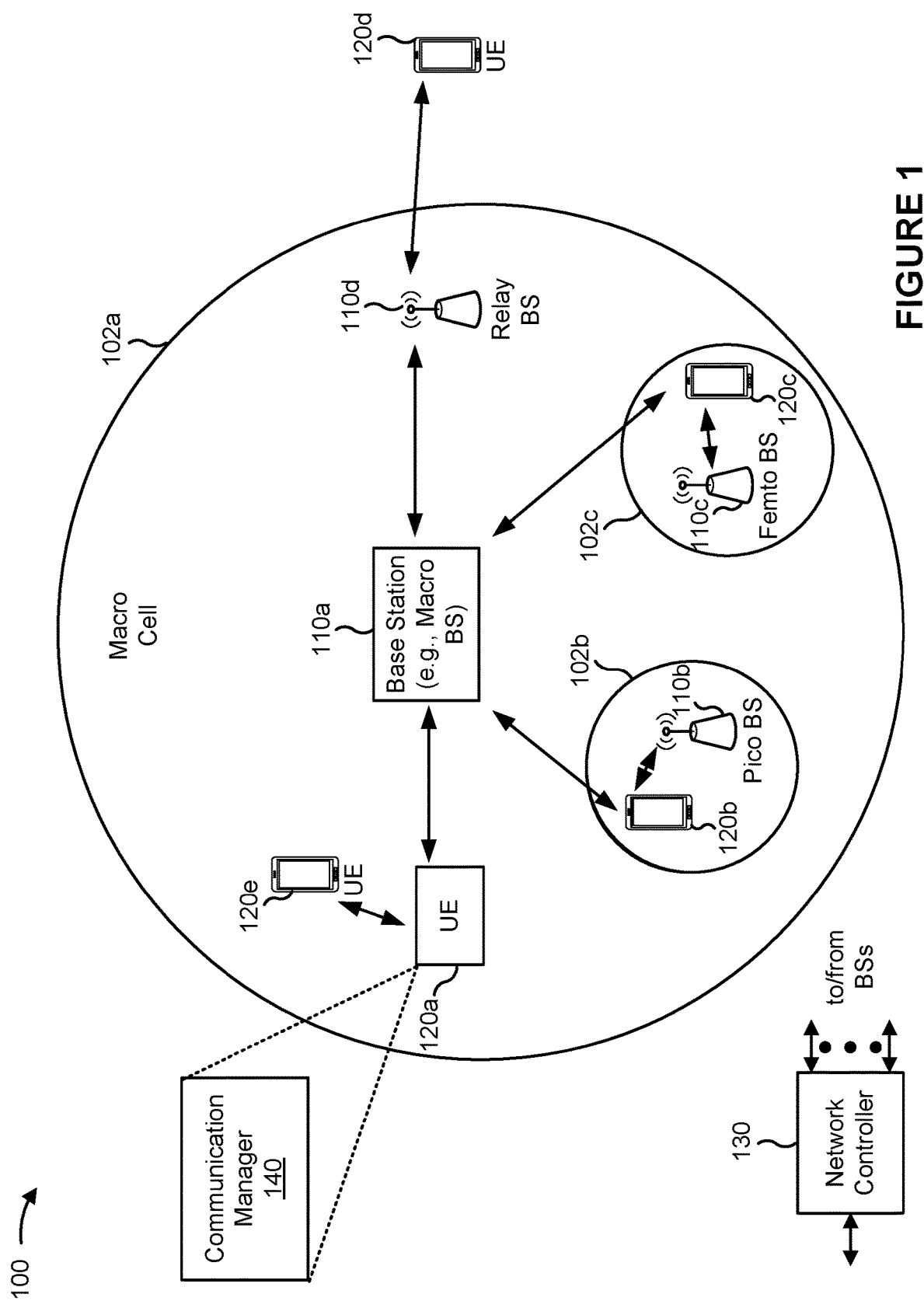
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to stabilizing a radio access technology (RAT) display indication for a user equipment (UE) operating in a dual connectivity mode. Some aspects more specifically relate to displaying an indication (for example, on a display or user interface of the UE) of a RAT associated with a secondary cell group (SCG) only after receiving an indication that a random access channel (RACH) procedure with the SCG is successful. In some aspects, the UE may pass an indication that the RACH procedure with the SCG is successful from a lower layer of the UE (such as a medium access control (MAC) layer) to an upper layer of the UE (such as a non-access stratum (NAS) layer or a data service layer) to enable the upper layer to cause an indication of the RAT associated with the SCG to be displayed by the UE. For example, the upper layer may transmit information to an application associated with a display or user interface of the UE to cause an indication (such as an icon) of the RAT associated with the SCG to be displayed by the UE based at least in part on receiving the indication that the RACH procedure with the SCG is successful.

In some other aspects, the UE may display an indication of a RAT associated with the SCG based at least in part on a bearer type associated with the SCG and the indication that the RACH procedure with the SCG is successful. For example, the UE (such as the upper layer of the UE) may detect that a bearer type associated with a cell is an SCG bearer or a split bearer. Therefore, the UE may wait for an indication that a RACH procedure with the cell is successful before transmitting information to cause an indication of a RAT associated with the cell to be displayed by the UE. In some aspects, if the UE detects a RACH failure associated with the SCG, then the UE may initiate a timer (such as a hysteresis timer). If the UE (for example, the upper layer of the UE) does not receive an indication that a RACH procedure with the SCG is successful (for example, after detecting the RACH failure) before an expiration of the timer, then the UE may transmit information to cause an indication of a RAT associated with a master cell group (MCG) to be displayed by the UE (rather than the indication of the RAT associated with the SCG). In some other aspects, if the UE detects a RACH failure associated with the SCG, then the UE may determine a quantity of RACH failures associated with the SCG (for example, in a time window). If the quantity of RACH failures associated with the SCG satisfies a threshold, then the UE may transmit information to cause an indication of a RAT associated with the MCG to be displayed by the UE (rather than the indication of the RAT associated with the SCG).

Particular aspects of the subject matter described in this disclosure can be implemented to realize one or more of the following potential advantages. In some examples, the described techniques can be used to stabilize a RAT indication displayed by the UE in a dual connectivity mode. For example, the described techniques can be used to reduce a quantity of display changes for the RAT indication being displayed by the UE in the dual connectivity mode when the UE experiences a RACH failure with an SCG. This may conserve resources (such as processing resources) that would have otherwise been used associated with frequently reporting and changing a RAT icon being displayed by the UE over a period of time. Additionally, this may improve a user perception of the UE (for example, as frequent display changes for the RAT icon may result in a perception of poor performance).

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110*a*, BS 110*b*, BS 110*c*, and BS 110*d*) and other network entities. A base station (BS) is an entity that communicates with UEs and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular RAT and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

In some aspects, the UE 120 (for example, the UE 120a) may include a communication manager 140. As described in more detail elsewhere herein, the communication manager 140 may receive, from a base station associated with a first RAT, an indication to add a secondary cell associated with a second RAT in a dual connectivity mode; receive by a lower layer of the UE 120, from the secondary cell, an indication that an RACH procedure associated with the secondary cell is successful; and transmit, by an upper layer of the UE to an application associated with a display of the UE, information to cause an indication of the second RAT to be displayed by the UE based at least in part on a bearer type associated with a link with the secondary cell and the indication that the RACH procedure with the secondary cell is successful. Additionally or alternatively, the communication manager 140 may perform one or more other operations described herein.

Figure 2:
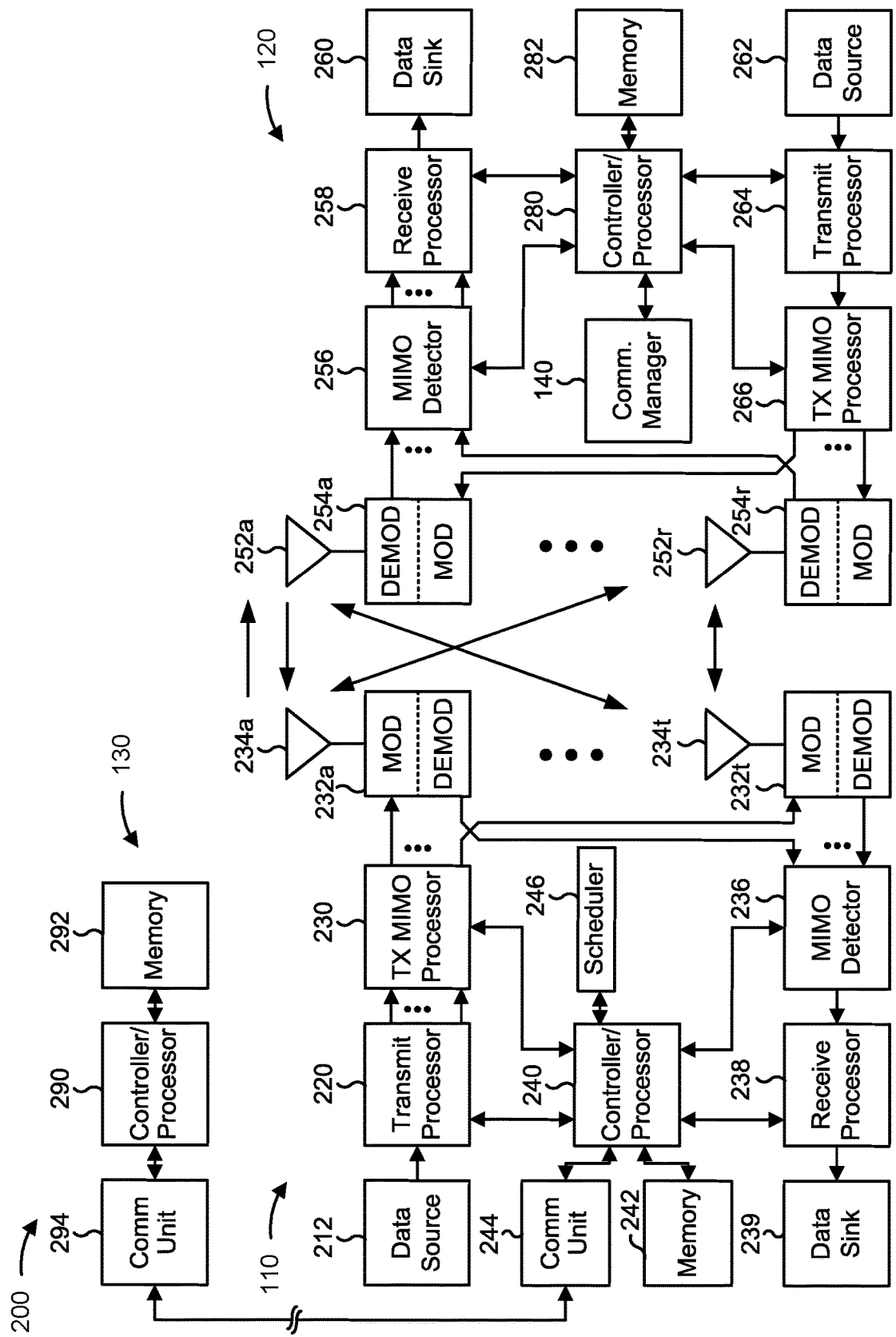
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with a RACH procedure based RAT display indication, as described in more detail elsewhere herein. For example, controller/processor 240 of base station 110, controller/processor 280 of UE 120, or any other component(s) of FIG. 2 may perform or direct operations of, for example, process 900 of FIG. 9, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, or other processes as described herein. In some aspects, executing instructions may include miming the instructions, converting the instructions, compiling the instructions, or interpreting the instructions, among other examples.

In some aspects, the UE 120 includes means for receiving, from a base station associated with a first RAT, an indication to add a secondary cell associated with a second RAT in a dual connectivity mode; means for receiving, by a lower layer of the UE 120, from the secondary cell, an indication that a RACH procedure associated with the secondary cell is successful; or means for transmitting, by an upper layer of the UE 120 and to an application associated with a display of the UE 120, information to cause an indication of the second RAT to be displayed by the UE 120 based at least in part on a bearer type associated with a link with the secondary cell and the indication that the RACH procedure with the secondary cell is successful. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

Figure 3:
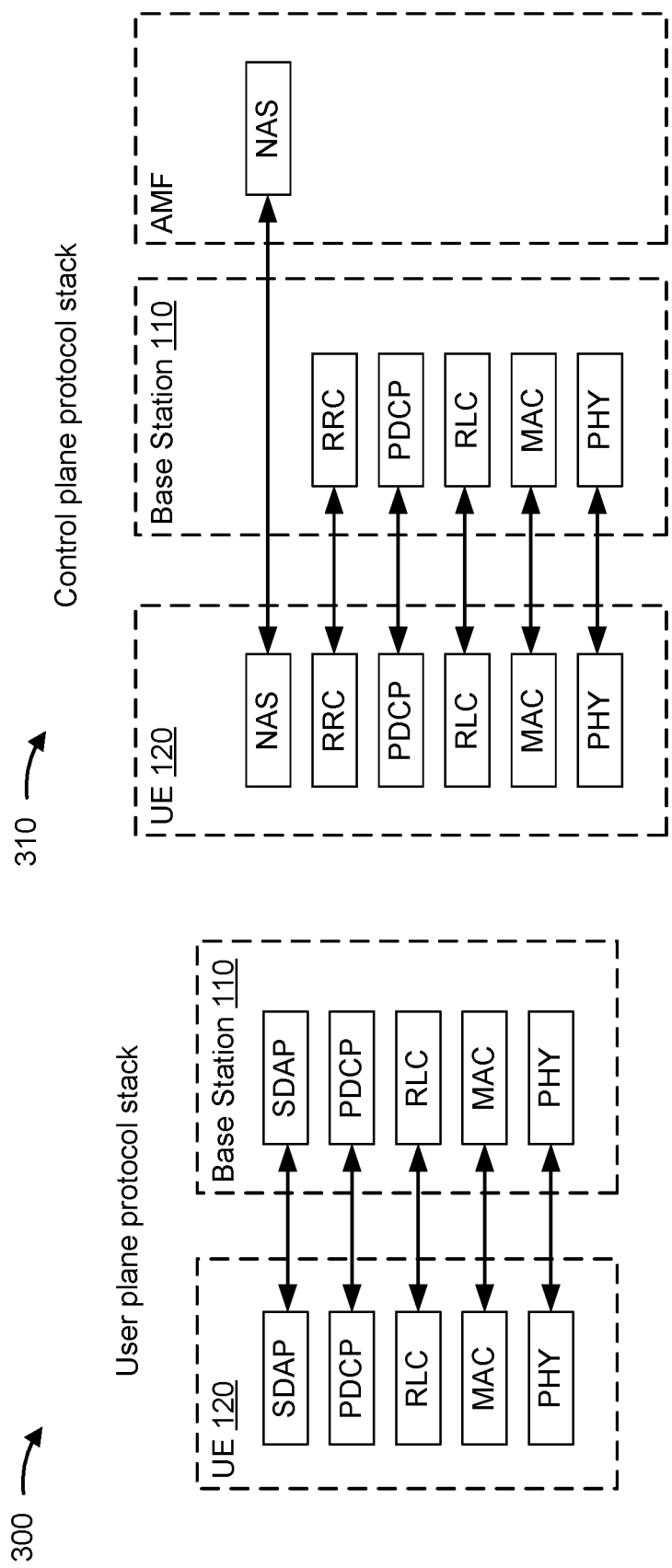
FIG. 3 is a diagram illustrating an example of a user plane protocol stack and a control plane protocol stack for a base station and a core network in communication with a UE, in accordance with the present disclosure.

FIG. 3 is a diagram illustrating an example of a user plane protocol stack 300 and a control plane protocol stack 310 for a base station 110 and a core network in communication with a UE 120, in accordance with the present disclosure. As shown in FIG. 3, the UE 120 and the base station 110 may include one or more layers for communication. The layers may perform different functions or operations for communications, as described in more detail herein.

On the user plane, the UE 120 and the base station 110 may include respective physical (PHY) layers, MAC layers, radio link control (RLC) layers, packet data convergence protocol (PDCP) layers, and service data adaptation protocol (SDAP) layers. A user plane function may handle transport of user data between the UE 120 and the base station 110. On the control plane, the UE 120 and the base station 110 may include respective radio resource control (RRC) layers. Furthermore, the UE 120 may include a NAS layer in communication with an NAS layer of an access and management mobility function (AMF). The AMF may be associated with a core network associated with the base station 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (for example, a PDCP entity may handle the services and functions of the PDCP layer), though the description herein refers to the layers themselves as handling the services and functions.

In some cases, the NAS layer may be referred to as, or may include, a data service layer. In some cases, the data service layer may be referred to as a packet switched (PS) service layer. For example, the data service layer may support session management functions for packet service sessions. The data services layer may be associated with a session management function of the NAS layer. In some cases, a determination of an indication or an icon to be displayed by a UE 120 (for example, displaying an icon associated a RAT that is being used by the UE 120) may be based at least in part on the PS service provided by the data service layer. For example, if the data service layer is capable or configured to provide a PS service for an NR or 5G RAT, then the data service layer may report that the NR or 5G RAT is supported to enabled the UE 120 to display an icon associated with the NR or 5G RAT on a user interface of the UE 120.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (for example, handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (for example, if the UE 120 is transmitting an uplink communication or the base station 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some examples, the RRC layer or the NAS layer may generate control information to be transmitted and may map the control information to one or more radio bearers for provision to the PDCP layer.

The SDAP layer, or the RRC layer or the NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (for example, in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (for example, if the UE 120 is receiving a downlink communication or the base station 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

In some cases, some procedures may be performed by different layers of the UE 120 or the base station 110. For example, an RACH procedure for establishing a connection between the UE 120 and the base station 110 (as depicted in, and described in connection with, FIGS. 3 and 4) may be performed at a Layer 2 of the UE 120 and the base station 110 (such as at the MAC layer). As described above, in some cases, RAT display determinations (for example, determinations of a RAT icon to be displayed by the UE 120) may occur in the upper layers, such as in the data service layer or the NAS layer.

Figure 4:
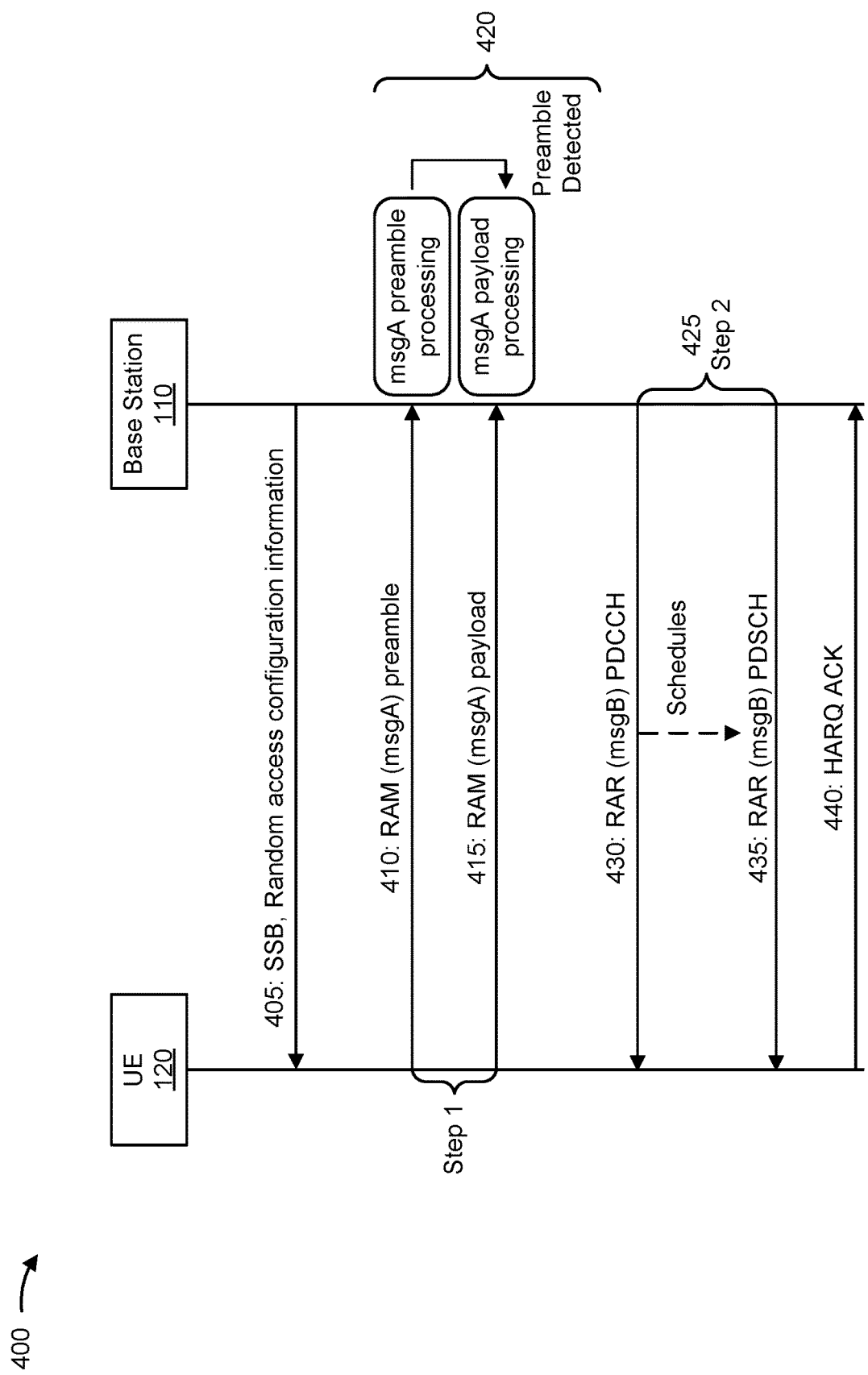
FIG. 4 is a diagram illustrating an example of a two-step random access procedure, in accordance with the present disclosure.

FIG. 4 is a diagram illustrating an example of a two-step random access procedure 400, in accordance with the present disclosure. For example, the two-step random access procedure 400 may be a two-step RACH procedure. As shown in FIG. 4, a base station 110 and a UE 120 may communicate with one another to perform the two-step random access procedure.

In a first operation 405, the base station 110 may transmit, and the UE 120 may receive, one or more synchronization signal blocks (SSBs) and random access configuration information. In some cases, the random access configuration information may be transmitted in or indicated by system information (for example, in one or more system information blocks (SIBs)) or an SSB, such as for contention-based random access. Additionally or alternatively, the random access configuration information may be transmitted in an RRC message or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) or receiving a random access response (RAR) to the RAM.

In a second operation 410, the UE 120 may transmit, and the base station 110 may receive, a RAM preamble. In a third operation 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some cases, the RAM may be referred to as message A, msgA, a first message, or an initial message in a two-step random access procedure. Furthermore, in some cases, the RAM preamble may be referred to as a message A preamble, a msgA preamble, a preamble, or a physical random access channel (PRACH) preamble, and the RAM payload may be referred to as a message A payload, a msgA payload, or a payload. In some cases, the RAM may include some or all of the contents of message 1 (msg1) and message 3 (msg3) of a four-step random access procedure, which is described in more detail below. For example, the RAM preamble may include some or all contents of message 1 (such as a PRACH preamble), and the RAM payload may include some or all contents of message 3 (such as a UE identifier, uplink control information (UCI), or a physical uplink shared channel (PUSCH) transmission).

In a fourth operation 420, the base station 110 may receive the RAM preamble transmitted by the UE 120. If the base station 110 successfully receives and decodes the RAM preamble, the base station 110 may then receive and decode the RAM payload.

In a fifth operation 425, the base station 110 may transmit an RAR (sometimes referred to as an RAR message). As shown, the base station 110 may transmit the RAR message as part of a second step of the two-step random access procedure. In some cases, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, or contention resolution information, among other examples.

In a sixth operation 430, as part of the second step of the two-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (such as in downlink control information (DCI)) for the PDSCH communication.

In a seventh operation 435, as part of the second step of the two-step random access procedure, the base station 110 may transmit the PDSCH communication for the RAR, as scheduled by the PDCCH communication. The RAR may be included in a MAC PDU of the PDSCH communication. In an eighth operation 440, if the UE 120 successfully receives the RAR, the UE 120 may transmit a HARQ acknowledgement (ACK).

Figure 5:
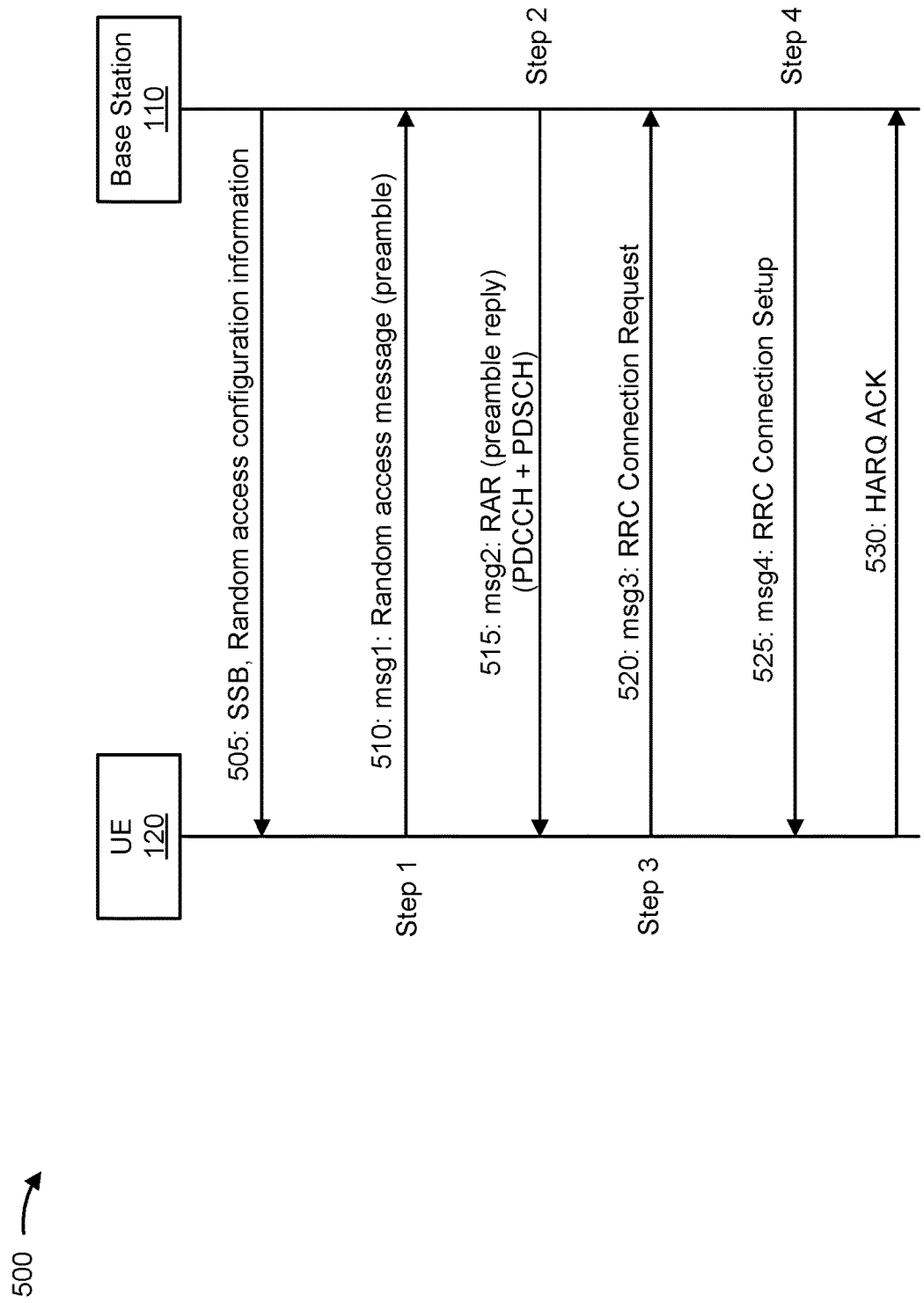
FIG. 5 is a diagram illustrating an example of a four-step random access procedure, in accordance with the present disclosure.

FIG. 5 is a diagram illustrating an example of a four-step random access procedure 500, in accordance with the present disclosure. For example, the four-step random access procedure 500 may be a four-step RACH procedure. As shown in FIG. 5, a base station 110 and a UE 120 may communicate with one another to perform the four-step random access procedure.

In a first operation 505, the base station 110 may transmit, and the UE 120 may receive, one or more SSBs and random access configuration information. In some cases, the random access configuration information may be transmitted in or indicated by system information (for example, in one or more SIBs) or an SSB, such as for contention-based random access. Additionally or alternatively, the random access configuration information may be transmitted in a RR) message or a PDCCH order message that triggers a RACH procedure, such as for contention-free random access. The random access configuration information may include one or more parameters to be used in the random access procedure, such as one or more parameters for transmitting a RAM or one or more parameters for receiving an RAR.

In a second operation 510, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in the four-step random access procedure 500. The random access message may include a random access preamble identifier.

In a third operation 515, the base station 110 may transmit an RAR as a reply to the preamble. The message that includes the RAR may be referred to as message 2, msg2, MSG2, or a second message in the four-step random access procedure 500. In some cases, the RAR may indicate the detected random access preamble identifier (for example, received from the UE 120 in msg1). Additionally or alternatively, the RAR may indicate a resource allocation to be used by the UE 120 to transmit message 3 (msg3).

In some cases, as part of the second step of the four-step random access procedure 500, the base station 110 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure 500, the base station 110 may transmit the PDSCH communication for the RAR, as scheduled by the PDCCH communication. The RAR may be included in a MAC PDU of the PDSCH communication.

In a fourth operation 520, the UE 120 may transmit an RRC connection request message. The RRC connection request message may be referred to as message 3, msg3, MSG3, or a third message of the four-step random access procedure 500. In some cases, the RRC connection request may include a UE identifier, UCI, or a PUSCH communication (such as an RRC connection request), among other examples.

In a fifth operation 525, the base station 110 may transmit an RRC connection setup message. The RRC connection setup message may be referred to as message 4, msg4, MSG4, or a fourth message of the four-step random access procedure 500. In some cases, the RRC connection setup message may include the detected UE identifier, a timing advance value, or contention resolution information, among other examples. In a sixth operation 530, if the UE 120 successfully receives the RRC connection setup message, the UE 120 may transmit a HARQ ACK.

In some cases, the UE 120 and the base station 110 may experience a RACH failure associated with performing the RACH procedure. "RACH failure" may refer to an event resulting in the RACH procedure not being successfully completed. For example, a step or operation of the RACH procedure may be associated with a timer. If the timer expires before the step or operation is completed (for example, before a RACH message associated with the step or operation is received by the UE 120), then the UE 120 may abandon the RACH procedure and experience a RACH failure. For example, after transmitting a msg1 (as described in connection with the second operation 510), then UE 120 may initiate a timer. If the timer expires prior to receiving a msg2 from the base station 110 (as described in connection with the third operation 515), then the UE 120 may determine that the RACH procedure has failed (for example, may determine or detect a RACH failure).

In some examples, a UE 120 may perform a RACH procedure (such as a two-step RACH procedure or a four-step RACH procedure) to establish a connection with a cell or with a base station 110. For example, in a dual connectivity mode (as depicted in, and described in connection with, FIG. 6), the UE 120 may perform a RACH procedure to add a secondary cell in the dual connectivity mode. After performing the RACH procedure, the UE 120 may enter a connected state (for example, an RRC connected state) with the secondary cell in the dual connectivity mode to enable the UE 120 to communicate with the secondary cell.

Figure 6:
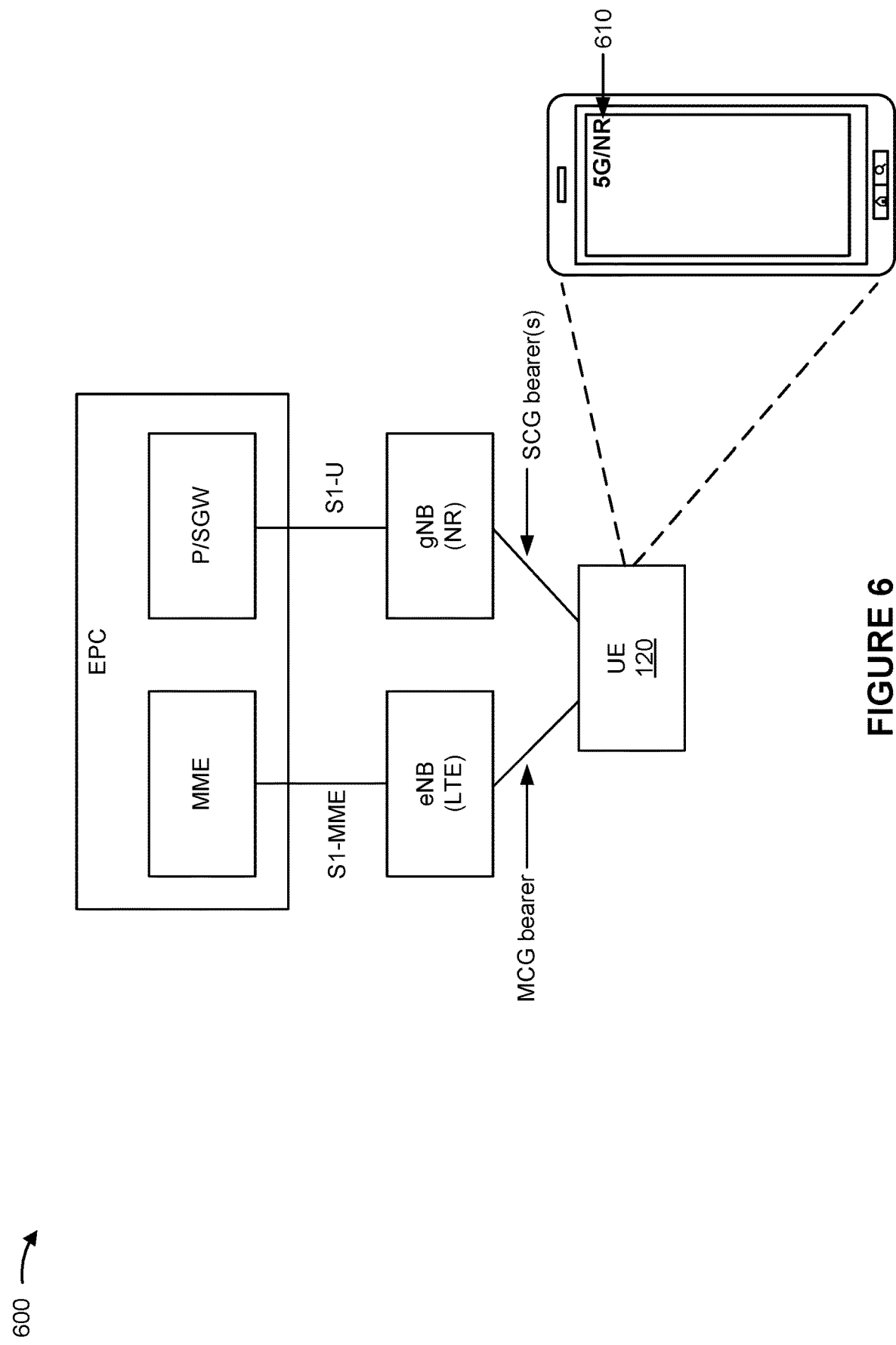
FIG. 6 is a diagram illustrating an example of dual connectivity, in accordance with the present disclosure.

FIG. 6 is a diagram illustrating an example of dual connectivity 600, in accordance with the present disclosure. The example shown in FIG. 6 is for an Evolved Universal Mobile Telecommunications System Terrestrial Radio Access (E-UTRA)-NR dual connectivity (ENDC) mode. In the ENDC mode, a UE 120 communicates using an LTE RAT on an MCG, and the UE 120 communicates using an NR RAT on an SCG.

However, examples described herein may apply to an ENDC mode (such as where the MCG is associated with an LTE RAT and the SCG is associated with an NR RAT), an NR-E-UTRA dual connectivity (NEDC) mode (such as where the MCG is associated with an NR RAT and the SCG is associated with an LTE RAT), an NR dual connectivity (NRDC) mode (such as where the MCG is associated with an NR RAT and the SCG is also associated with the NR RAT), or another dual connectivity mode (such as where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, or another type of dual connectivity mode.

As shown in FIG. 6, a UE 120 may communicate with both an eNB (for example, a 4G base station 110) and a gNB (for example, a 5G base station 110), and the eNB and the gNB may communicate (for example, directly or indirectly) with a 4G/LTE core network, shown as an evolved packet core (EPC) that includes a mobility management entity (MME), a packet data network gateway (PGW), a serving gateway (SGW), or other devices. In FIG. 6, the PGW and the SGW are shown collectively as P/SGW. In some cases, the eNB and the gNB may be co-located at the same base station 110. In some other cases, the eNB and the gNB may be included in different base stations 110 (for example, may not be co-located).

As further shown in FIG. 6, in some examples, a wireless network that enables operation in a 5G NSA mode may enable such operations using an MCG for a first RAT (such as an LTE RAT or a 4G RAT) and an SCG for a second RAT (such as an NR RAT or a 5G RAT). In such examples, the UE 120 may communicate with the eNB via the MCG and may communicate with the gNB via the SCG. In some cases, the MCG may anchor a network connection between the UE 120 and the 4G/LTE core network (for example, for mobility, coverage, or control plane information), and the SCG may be added as additional carriers to increase throughput (for example, for data traffic or user plane information). Therefore, a RAT associated with the MCG may be referred to as an anchor RAT, and a RAT associated with the SCG may be referred to as a secondary RAT. In some cases, the gNB and the eNB may not transfer user plane information between one another. In some cases, a UE 120 operating in a dual connectivity mode may be concurrently connected with an LTE base station 110 (for example, an eNB) and an NR base station 110 (for example, a gNB) (such as in the case of ENDC or NEDC), or may be concurrently connected with one or more base stations 110 that use the same RAT (for example, in the case of NRDC). In some examples, the MCG may be associated with a first frequency band (such as a sub-6 GHz band or an FR1 band) and the SCG may be associated with a second frequency band (such as a millimeter wave band or an FR2 band).

The UE 120 may communicate via the MCG and the SCG using one or more radio bearers (such as DRBs or SRBs). For example, the UE 120 may transmit or receive data via the MCG or the SCG using one or more DRBs. Similarly, the UE 120 may transmit or receive control information (for example, RRC information or measurement reports) using one or more SRBs. In some cases, a radio bearer may be dedicated to a specific cell group (for example, a radio bearer may be an MCG bearer or an SCG bearer). In some other cases, a radio bearer may be a split radio bearer. A split radio bearer may be split in the uplink or in the downlink. For example, a DRB may be split on the downlink (such that the UE 120 may receive downlink information for the MCG or the SCG in the DRB) but not on the uplink (such that the uplink may be non-split with a primary path to the MCG or the SCG, such that the UE 120 transmits in the uplink only on the primary path). In some examples, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB. In some examples, a split bearer may have a PDCP that is anchored at the MCG, and may use RLC, MAC, or PHY resources of the MCG and the SCG.

As shown in FIG. 6, in a dual connectivity mode, the UE 120 may display an indication (for example, an icon) associated with a RAT. For example, the UE 120 may display (on a user interface of the UE 120) an icon associated with a first RAT associated with the MCG or a second RAT associated with the SCG. For example, in the ENDC mode, the UE 120 may display an icon 610 (shown as "5G/NR") associated with the second RAT on a user interface of the UE 120, indicating that the UE 120 is capable of connecting to a base station 110 or a cell of the second RAT.

Figure 7:
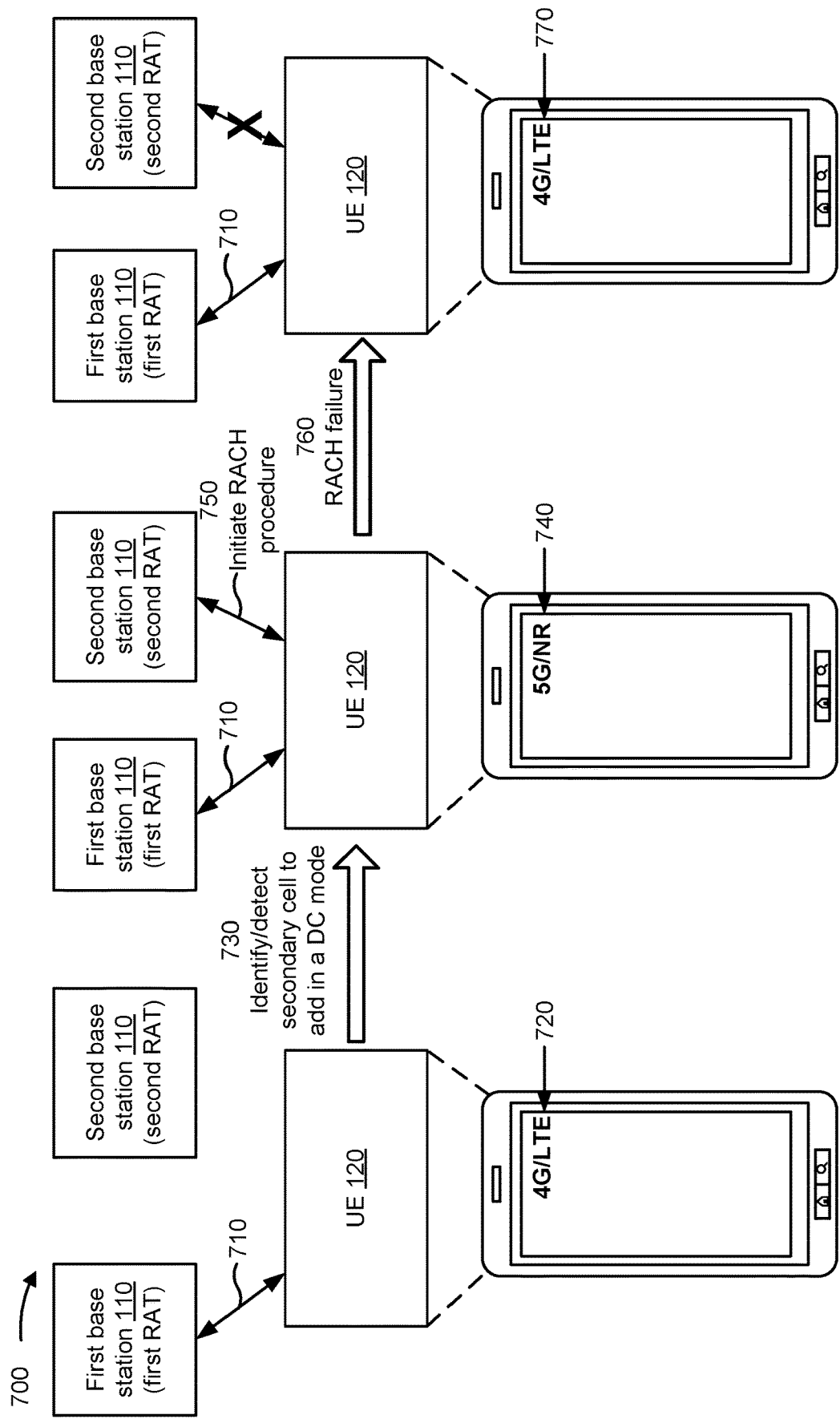
FIG. 7 is a diagram illustrating an example of radio access technology (RAT) display indications in a dual connectivity mode, in accordance with the present disclosure.

FIG. 7 is a diagram illustrating an example of RAT display indications 700 in a dual connectivity mode, in accordance with the present disclosure. As described above, a UE 120 may display (for example, using a user interface of the UE 120) an indication of a RAT that the UE 120 is using, or is capable of using, for communications. For example, the UE 120 may display an icon associated with a RAT that the UE 120 is using, or is capable of using, for communication. As described above, in a dual connectivity mode, the UE 120 may display an icon of a RAT associated with an SCG. For example, the RAT associated with the SCG may be associated with improved performance as compared to the RAT of an MCG (such as higher data rate, higher throughput, or improved communication efficiency, among other examples). For example, in an ENDC mode, the NR RAT may be associated with improved performance as compared to the LTE RAT. Therefore, the UE 120 may display an icon of the NR RAT associated with the SCG to indicate that the UE 120 is capable of connecting to a base station 110 or a cell of the NR RAT associated with the SCG, and is therefore capable of communicating with the improved performance associated with the NR RAT.

For example, as shown in FIG. 7, the UE 120 may establish a connection 710 with a first base station 110 that is associated with a first RAT, such as the LTE RAT. As a result, the UE 120 may display an indication 720 of the LTE RAT (shown as "4G/LTE" in FIG. 7). For example, an upper layer of the UE 120, such as a data service layer, may report a RAT that the UE 120 is connected to, or is capable of using for communications, for the purposes of displaying an icon of the RAT. The UE 120 may use the RAT reported by the upper layer (such as the data service layer) to determine an icon to be displayed on the user interface of the UE 120. For example, as shown in FIG. 7, the UE 120 may establish the connection 710 using the LTE RAT. Therefore, the data service layer may report the LTE RAT to enable the UE 120 to display the indication 720.

In a first operation 730, the UE 120 may identify or detect a secondary cell to add in a dual connectivity mode. For example, the UE 120 may detect a second base station 110 associated with a second RAT, such as the NR RAT. For example, the upper layer of the UE 120 (the data service layer) may detect that the first base station 110 is capable of supporting the NR RAT and may detect that the UE 120 is capable of communicating using the NR RAT. The UE 120 may be configured with a measurement configuration (for example, by the first base station 110). For example, the UE 120 may be configured with an inter-RAT measurement configuration for reporting measurements of the second base station 110. The measurement configuration may indicate one or more measurement events for reporting measurement values of cells associated with the second RAT (the NR RAT) to the first base station 110. For example, a measurement event may be associated with a threshold value, such that the UE 120 is to report a measurement of an inter-RAT neighbor cell when the inter-RAT neighbor cell signal strength is better than the threshold (such as a B1 measurement event as defined, or otherwise fixed, by a wireless communication standard). As another example, a measurement event may be associated with a signal strength of an inter-RAT neighbor cell satisfying a first threshold and a signal strength of a serving cell not satisfying a second threshold (such as a B2 measurement event as defined, or otherwise fixed, by a wireless communication standard).

In the first operation 730, the UE 120 may measure a signal strength associated with the second base station 110. The UE 120 may detect that a measurement event (as configured by the measurement configuration) for the second base station 110 has been satisfied. Therefore, the UE 120 may transmit, to the first base station 110, a measurement report indicating a measurement of the signal strength (or signal quality) associated with the second base station 110. Transmitting the measurement report to the first base station 110 may enable the second base station 110 to be added as an SCG in a dual connectivity mode, in a similar manner as described above in connection with FIG. 6.

As shown in FIG. 7, the upper layer of the UE 120 (for example, the data service layer) may detect that the UE 120 has transmitted the measurement report associated with the second base station 110. As described above, the upper layer of the UE 120 (for example, the data service layer) may detect that the first base station 110 and the UE 120 are both capable of supporting the second RAT (the NR RAT) associated with the second base station 110. As a result, the upper layer of the UE 120 (for example, the data service layer) may report that the UE 120 is capable of communicating using the second RAT (the NR RAT) as the measurement event for the second RAT has been satisfied. Therefore, as shown in FIG. 7, the UE 120 may display an indication 740 of the second NR RAT (shown as "5G/NR" in FIG. 7) using a user interface of the UE 120. For example, as one or more conditions for enabling the UE 120 to communicate using the NR RAT have been satisfied (such as the UE 120 being capable of supporting the NR RAT, the first base station 110 being capable of supporting the NR RAT as an SCG, and the measurement event for a cell associated with the NR RAT being satisfied), the upper layer (the data service layer) may report the NR RAT to be displayed by the UE 120.

In a second operation 750, the UE 120 and the second base station 110 may initiate a RACH procedure, such as a two-step RACH procedure or a four-step RACH procedure as described in more detail herein. For example, to establish an active connection with the second base station 110 in the dual connectivity mode, the UE 120 may attempt to perform the RACH procedure with the second base station 110. In a third operation 760, the UE 120 may experience a RACH failure associated with performing the RACH procedure. "RACH failure" may refer to an event resulting in the RACH procedure not being successfully completed. For example, a step or operation of the RACH procedure may be associated with a timer. If the timer expires before the step or operation is completed (for example, before a RACH message associated with the step or operation is received by the UE 120), then the UE 120 may abandon the RACH procedure and experience a RACH failure.

As shown in FIG. 7, based at least in part on experiencing the RACH failure, a connection with the second base station 110 may not be established. Therefore, the second base station 110 may not be added as an SCG in the dual connectivity mode. As a result, the upper layer of the UE 120 may detect that the second base station 110 has not been added as an SCG in the dual connectivity mode. Therefore, the upper layer of the UE 120 may report the LTE RAT to be displayed by the UE 120. For example, the UE 120 may display an indication 770 of the LTE RAT based at least in part on the upper layer of the UE 120 detecting that the second base station 110 has not been added as an SCG in the dual connectivity mode (such as due to a RACH failure). Therefore, as shown in FIG. 7, the UE 120 may return to a state similar to the state in which the UE 120 displayed the indication 720.

In some cases, as the measurement event associated with the second RAT (the NR RAT) for the second base station 110 may still be satisfied, the UE 120 may transmit a measurement report associated with the second base station 110 and may attempt to add the second base station 110 as an SCG in a similar manner as described above. As a result, the upper layer of the UE 120 may cause an icon displayed by the UE 120 to switch to an icon associated with the second RAT (for example, to switch from displaying the indication 720 to displaying the indication 740). As described above, the UE 120 may experience another RACH failure with the second base station 110. As a result, the upper layer of the UE 120 may enable an icon displayed by the UE 120 to be switched to an icon associated with the first RAT (for example, to switch from displaying the indication 740 to displaying the indication 770). Therefore, the UE 120 may experience frequent display changes (for example, a change in a RAT icon being displayed by the UE 120). For example, the UE 120 may frequently switch between displaying an icon for the LTE RAT and displaying an icon for the NR RAT. This may negatively impact user perception of the UE 120 (for example, as the frequent display changes for the RAT icon may result in a perception of poor performance). Moreover, the frequent display changes for the RAT icon being displayed by the UE 120 may consume resources (such as processing resources) associated with reporting and changing the RAT icon being displayed by the UE 120 frequently over a short period of time.

Various aspects relate generally to stabilizing a RAT display indication for a UE 120 operating in a dual connectivity mode. Some aspects more specifically relate to displaying an indication (for example, on a display or user interface of the UE 120) of a RAT associated with an SCG only after receiving an indication that a RACH procedure with the SCG is successful. In some aspects, the UE 120 may pass an indication that the RACH procedure with the SCG is successful from a lower layer of the UE 120 (such as the MAC layer) to an upper layer of the UE 120 (such as the NAS layer or the data service layer) to enable the upper layer to cause an indication of the RAT associated with the SCG to be displayed by the UE 120. For example, the upper layer may transmit information to an application associated with a display or user interface of the UE 120 to cause an indication (such as an icon) of the RAT associated with the SCG to be displayed by the UE based at least in part on receiving the indication that the RACH procedure with the SCG is successful.

In some other aspects, the UE 120 may display an indication of a RAT associated with the SCG based at least in part on a bearer type associated with the SCG and the indication that the RACH procedure with the SCG is successful. For example, the UE 120 (such as the upper layer of the UE 120) may detect that a bearer type associated with a cell is an SCG bearer or a split bearer. Therefore, the UE 120 may wait for an indication that a RACH procedure with the cell is successful before transmitting information to cause an indication of a RAT associated with the cell to be displayed by the UE 120. In some aspects, if the UE 120 detects a RACH failure associated with the SCG, then the UE 120 may initiate a timer (such as a hysteresis timer). If the UE 120 (for example, the upper layer of the UE 120) does not receive an indication that a RACH procedure with the SCG is successful (for example, after detecting the RACH failure)

before an expiration of the timer, then the UE 120 may transmit information to cause an indication of a RAT associated with the MCG to be displayed by the UE 120 (rather than the indication of the RAT associated with the SCG). In some other aspects, if the UE 120 detects a RACH failure associated with the SCG, then the UE 120 may determine a quantity of RACH failures associated with the SCG (for example, in a time window). If the quantity of RACH failures associated with the SCG satisfies a threshold, then the UE 120 may transmit information to cause an indication of a RAT associated with the MCG to be displayed by the UE 120 (rather than the indication of the RAT associated with the SCG).

Particular aspects of the subject matter described in this disclosure can be implemented to realize one or more of the following potential advantages. In some examples, the described techniques can be used to stabilize a RAT indication displayed by the UE 120 in a dual connectivity mode. For example, the described techniques can be used to reduce a quantity of display changes for the RAT indication being displayed by the UE 120 in the dual connectivity mode when the UE 120 experiences a RACH failure with an SCG. This may conserve resources (such as processing resources) that would have otherwise been used associated with frequently reporting and changing a RAT icon being displayed by the UE 120 over a period of time. Additionally, this may improve a user perception of the UE 120 (for example, as frequent display changes for the RAT icon may result in a perception of poor performance).

Figure 8:
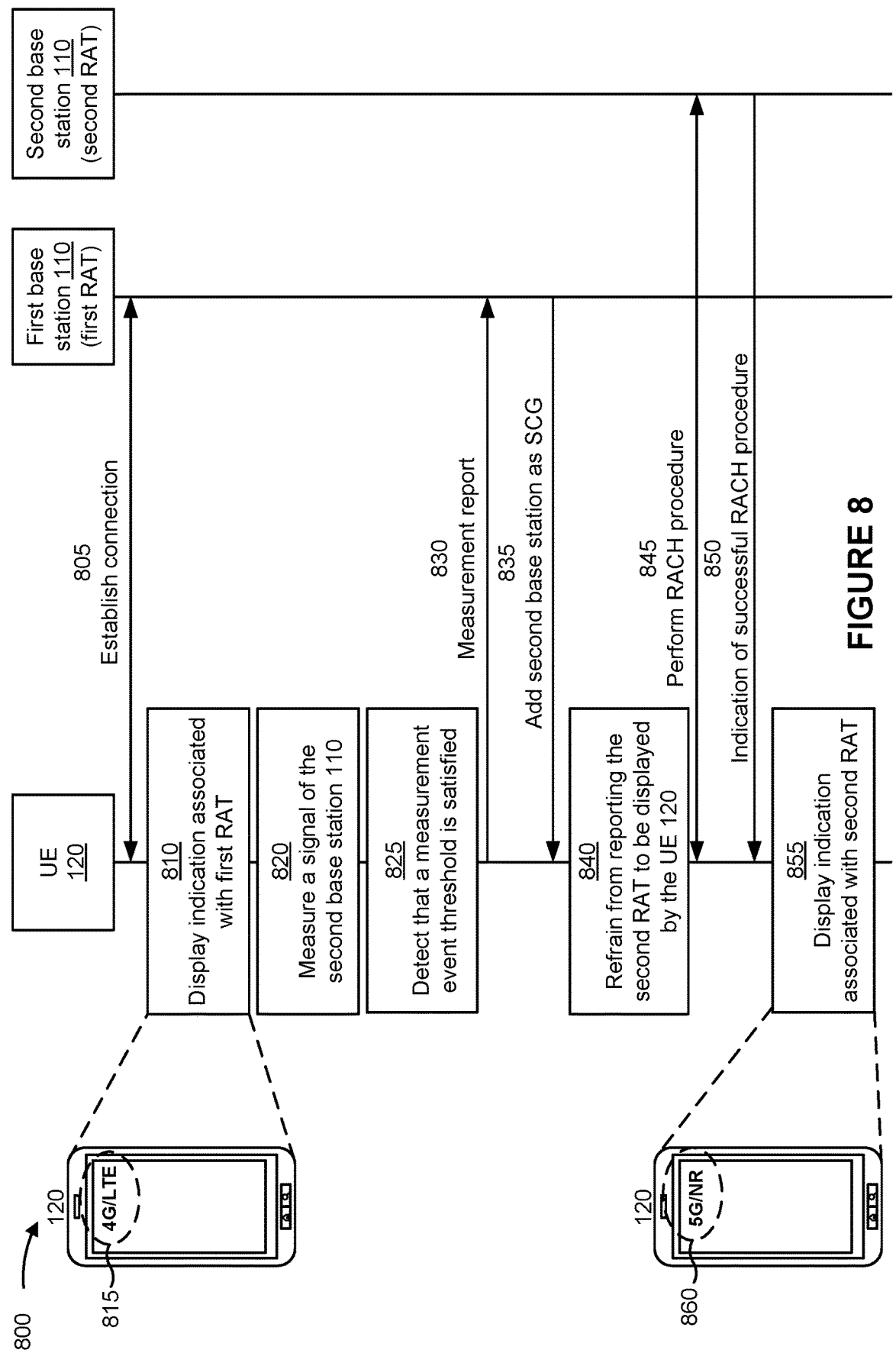
FIG. 8 is a diagram illustrating an example associated with random access channel (RACH) procedure based RAT display indications, in accordance with the present disclosure.

FIG. 8 is a diagram illustrating an example associated with RACH procedure based RAT display indications 800, in accordance with the present disclosure. As shown in FIG. 8, one or more base stations 110 and a UE 120 may communicate with one another in a wireless network, such as wireless network 100. In some aspects, the UE 120 may be capable of operating in a dual connectivity mode, in a similar manner as described in connection with FIGS. 6 and 7. For example, the UE 120 may communicate with a first base station 110 that is associated with a first RAT. Similarly, the UE 120 may communicate with a second base station 110 that is associated with a second RAT. In some aspects, the first base station 110 and the second base station 110 may be different, separate base stations. In some other aspects, the first base station 110 and the second base station 110 may be the same base station (or may be co-located). As depicted in FIG. 8, and described herein, the dual connectivity mode may be an ENDC mode where the first RAT is an LTE RAT or a 4G RAT and the second RAT is an NR RAT or a 5G RAT. However, the techniques and operations described herein may be similarly applied to other dual connectivity modes, such as an NEDC mode or an NRDC mode, among other examples.

In a first operation 805, the UE 120 may establish a connection (for example, a communication connection or communication link) with the first base station 110. In some aspects, the first base station 110 may be an anchor base station or a base station associated with an MCG for a dual connectivity mode, as described in more detail herein. In some aspects, the UE 120 may establish the connection with the first base station 110 based at least in part on performing a RACH procedure with the first base station 110.

In a second operation 810, the UE 120 may display an indication 815 of the first RAT based at least in part on establishing the connection with the first base station 110. For example, as shown in FIG. 8, the first RAT may be an LTE RAT or a 4G RAT and the UE 120 may display (such as on a display or user interface of the UE 120) the indication 815 of the LTE RAT or the 4G RAT (shown as "4G/LTE" in FIG. 8). For example, the indication 815 may be an icon indicating the first RAT (such as the LTE RAT or the 4G RAT).

As described above, the first base station 110 may be an anchor base station or an MCG for a dual connectivity mode. For example, the first base station 110 may transmit, and the UE 120 may receive, an indication that the first base station 110 is capable of supporting a dual connectivity mode. For example, the first base station 110 may transmit, and the UE 120 may receive, an indication that the first base station 110 is capable of serving as an MCG in a dual connectivity mode.

In some aspects, the UE 120 may be capable of supporting a dual connectivity mode. For example, a capability of the UE 120 may indicate that the UE 120 is capable of supporting (such as capable of communicating using) the second RAT, such as the NR RAT or the 5G RAT. In some aspects, the UE 120 may transmit, and the first base station 110 may receive, an indication of the capability of the UE 120 (for example indicating that the UE 120 is capable of supporting the second RAT).

Therefore, the UE 120 may identify (for example, an upper layer, such as the NAS layer or the data service layer) that the UE 120 is capable of supporting the second RAT and a dual connectivity mode. Additionally, the UE 120 may identify (for example, an upper layer, such as the NAS layer or the data service layer) that the first base station 110 is capable of supporting a dual connectivity mode (for example, is capable of serving as an MCG in a dual connectivity mode). Therefore, the UE 120 may identify that the UE 120 may be enabled to operate in the dual connectivity mode if a suitable secondary cell (for example, a suitable SCG) is identified by the UE 120.

In some aspects, the first base station 110 may transmit, and the UE 120 may receive, a measurement configuration. For example, the measurement configuration may be an inter-RAT measurement configuration indicating information associated with measuring signals associated with the second RAT. In some aspects, the UE 120 may be configured with an inter-RAT measurement configuration for reporting measurements of the second base station 110. The measurement configuration may indicate one or more measurement events for reporting measurement values of cells associated with the second RAT (the NR RAT) to the first base station 110. For example, a measurement event may be associated with a threshold value, such that the UE 120 is to report a measurement of an inter-RAT neighbor cell when the inter-RAT neighbor cell signal strength is better than the threshold (such as a B1 measurement event as defined, or otherwise fixed, by a wireless communication standard). As another example, a measurement event may be associated with a signal strength of an inter-RAT neighbor cell satisfying a first threshold and a signal strength of a serving cell not satisfying a second threshold (such as a B2 measurement event as defined, or otherwise fixed, by a wireless communication standard). In some aspects, the measurement configuration may indicate measurement resources (for example, time domain and frequency domain resources) to be measured by the UE 120. In some aspects, the measurement configuration may indicate reporting resources (for example, time domain and frequency domain resources) to be used by the UE 120 to transmit a measurement report to the first base station 110 (for example, if a threshold associated with a measurement event is satisfied).

In a third operation 820, the UE 120 may measure a signal of the second base station 110. For example, the UE 120 may measure the signal of the second base station 110 in accordance with the measurement configuration. The UE 120 may measure one or more parameters (such as RSRP or RSRQ, among other examples) of the signal. In a fourth operation 825, the UE 120 may detect that a measurement event threshold is satisfied. For example, the UE 120 may detect that a measurement event associated with transmitting a measurement report associated with the second RAT has been triggered based at least in part on measuring the signal of the second base station 110. For example, the measurement event may be a B1 event or a B2 event.

In a fifth operation 830, the UE 120 may transmit, and the first base station 110 may receive, a measurement report indicating one or more measurement values of the signal of the second base station 110. For example, the UE 120 may transmit the measurement report based at least in part on detecting that the measurement event associated with transmitting a measurement report associated with the second RAT has been triggered (as described in connection with the fourth operation 825). The measurement report may identify the second base station 110 and may identify one or more measurement values (such as RSRP values or RSRQ values, among other examples) of the signal of the second base station 110 measured by the UE 120.

The first base station 110 may receive the measurement report and may determine that the second base station 110 is a suitable base station to be added as a secondary cell or an SCG in a dual connectivity mode. For example, the first base station 110 may determine that a measurement value of the second base station 110 satisfies a measurement event threshold (such as a B1 event or a B2 event). Therefore, in a sixth operation 835, the first base station 110 may transmit, and the UE 120 may receive, an indication to add the second base station 110 as a secondary cell (for example, an SCG) in a dual connectivity mode.

For example, based at least in part on receiving the measurement report (as described in connection with the fifth operation 830), the first base station 110 may transmit, and the second base station 110 may receive, an addition request message indicating that the second base station 110 is to be added as a secondary cell (as SCG) associated with the first base station 110. For example, the addition request message may indicate UE 120 capability information, measurement information, security information, or radio bearer configuration information, among other examples. In some aspects, the second base station 110 may transmit, and the first base station 110 may receive, an addition request acknowledgement message indication an acknowledgement (or an acceptance of) the addition request message. For example, the addition request acknowledgement message may indicate radio resource configuration for the SCG (associated with the second base station 110), radio bearer configuration for the SCG, or security information for the SCG, among other examples.

The first base station 110 may transmit the indication to add the second base station 110 as a secondary cell to the UE 120 based at least in part on receiving the addition request acknowledgement message from the second base station 110. In some aspects, the indication to add the second base station 110 as a secondary cell or SCG may be associated with an RRC message. For example, the first base station 110 may transmit, and the UE 120 may receive, an RRC message (such as an RRC reconfiguration message) indicating information associated with the second base station 110. For example, the RRC message may identify the second base station 110, may indicate radio resource configuration for the SCG (associated with the second base station 110), may indicate radio bearer configuration for the SCG, or may indicate security information for the SCG, among other examples.

In a seventh operation 840, the UE 120 may refrain from reporting the second RAT to be displayed by the UE 120. For example, the upper layer of the UE 120 (such as the NAS layer or the data service layer) may detect that the UE 120 is capable of supporting the second RAT, that the first base station 110 is capable of supporting the second RAT as an SCG, and that the measurement event associated with the second RAT has been triggered, as described above. However, the UE 120 (for example, the upper layer of the UE 120) may refrain from reporting the second RAT to an application (for example, an application processor of the UE 120) that is associated with the display or user interface of the UE 120. For example, upper layer of the UE 120 may refrain from the reporting the second RAT to the application of the UE 120 until the upper layer receives an indication that a RACH procedure with the second base station 110 is successful, as described in more detail herein. This may ensure that the second RAT is reported (and displayed) by the UE 120 only when the connection with the second base station 110 is stable or in a connected state (for example, an RRC connected state).

In some aspects, the UE 120 may refrain from reporting the second RAT to be displayed by the UE 120 based at least in part on a bearer type associated with a radio bearer of the second base station 110. For example, the UE 120 (the upper layer of the UE 120) may refrain from reporting the second RAT to be displayed by the UE 120 based at least in part on the bearer type of the second base station 110 being an SCG bearer or a split bearer. For example, an SCG bearer type or a split bearer type may indicate that the second base station 110 is a secondary cell or an SCG in a dual connectivity mode. Therefore, the UE 120 may refrain from the reporting the second RAT to be displayed until the upper layer receives an indication that a RACH procedure with the second base station 110 is successful. This may ensure a stable display of the RAT indication in a dual connectivity mode, as described in more detail herein.

In some aspects, the UE 120 may refrain from reporting the second RAT to be displayed by the UE 120 based at least in part on detecting one or more RACH failures with the second base station 110. For example, based at least in part on receiving the indication to add the second base station 110 as an SCG, the UE 120 may initiate a RACH procedure with the second base station 110, as described in more detail herein. In some aspects, the UE 120 may refrain from reporting the second RAT to be displayed by the UE 120 based at least in part on a quantity of RACH failures with the second base station 110 in a first time window satisfying a first threshold. In some aspects, a value of the first threshold may be configured at the UE 120 (for example, in an original equipment manufacturer (OEM) configuration). Similarly, a duration of the first time window may be configured at the UE 120 (for example, in an OEM configuration).

In some other aspects, the UE 120 may refrain from reporting the second RAT to be displayed by the UE 120 based at least in part on detecting one or more display changes associated with changing an indication being displayed by the UE 120 between the first RAT and the second RAT. For example, the UE 120 may detect that a quantity of display changes in a second time window (such as a quantity of instances of the upper layer reporting a different RAT to be displayed by the UE 120) satisfies a second threshold. In some aspects, a value of the second threshold may be configured at the UE 120 (for example, in an OEM configuration). Similarly, a duration of the time window may be configured at the UE 120 (for example, in an OEM configuration). In some aspects, the first time window and the second time window may be the same or may have the same duration. Alternatively, the first time window and the second time window may be different or may have different durations.

For example, in some aspects, if the quantity of RACH failures in the first time window does not satisfy the first threshold or if the quantity of display changes in the second time window does not satisfy the second threshold, then the UE 120 may report the second RAT to be displayed prior to receiving the indication of a successful RACH procedure with the second base station 110. In such examples, the upper layer of the UE 120 may report the second RAT to an application processor to cause the second RAT to be displayed by the UE 120 after detecting that the UE 120 is capable of supporting the second RAT, that the first base station 110 is capable of supporting the second RAT as an SCG, and that the measurement event associated with the second RAT has been triggered, as described above. This may enable the UE 120 to quickly report the second RAT to be displayed when the UE 120 is not experiencing RACH failures with the second base station 110 or when the UE 120 is in an area of good coverage for the SCG (associated with the second base station 110).

In an eighth operation 845, the UE 120 and the second base station 110 may perform a RACH procedure to establish a connection. For example, the UE 120 and the second base station 110 may perform a two-step RACH procedure or a four-step RACH procedure. The UE 120 may initiate the RACH procedure with the second base station 110 based at least in part on receiving the indication to add the second base station 110 as an SCG (for example, the RRC reconfiguration message). For example, the UE 120 may monitor for or detect an SSB transmitted by the second base station 110 and may initiate the RACH procedure with the second base station 110 based at least in part on receiving the SSB, in a similar manner as described in connection with FIGS. 4 and 5.

In a ninth operation 850, the UE 120 may receive, from the second base station 110, an indication that the RACH procedure with the second base station 110 is successful. For example, the second base station 110 may transmit, and the UE 120 may receive, a RACH message (such as a msgB or a msg4) indicating that the RACH procedure with the second base station 110 is successful. As described in more detail herein, the RACH procedure with the second base station 110 may be performed by a lower layer of the UE 120, such as the MAC layer. For example, the RACH procedure may be a Layer 2 procedure. In some aspects, the lower layer (such as the MAC layer) may update a link status with the second base station 110 to indicate that the link status is in an RRC connected state (for example, to indicate that the link status is an RRC link status active). For example, the lower layer of the UE 120 may receive the indication that the RACH procedure is successful or that the RRC state with the second base station 110 is a connected state.

In some aspects, the lower layer of the UE 120 (for example, the MAC layer) may pass information to the upper layer of the UE 120 (for example, the NAS layer or the data service layer) to enable the upper layer to report the second RAT to be displayed by the UE 120. For example, the lower layer may transmit, or pass, an indication to the upper layer that the RACH procedure with the second base station 110 is successful based at least in part on receiving (by the lower layer) the indication that the radio link with the second base station 110 is active. In some aspects, the lower layer may transmit, or pass, the indication to the upper layer that the RACH procedure with the second base station 110 is successful based at least in part on receiving (by the lower layer) the indication that the RRC state with the second base station 110 is a connected state. As a result, the upper layer may be enabled to report the second RAT when a connection with the second base station 110 is stable (for example, when the UE 120 and the second base station 110 are operating in an RRC connected state).

In a tenth operation 855, the UE 120 may display an indication 860 of the second RAT based at least in part on receiving the indication that the RACH procedure with the second base station 110 is successful. For example, as shown in FIG. 8, the second RAT may be an NR RAT or a 5G RAT, and the UE 120 may display (such as on a display or user interface of the UE 120) the indication 860 of the NR RAT or the 5G RAT (shown as "5G/NR" in FIG. 8). For example, the indication 860 may be an icon indicating the second RAT.

In some aspects, the UE 120 may transmit by an upper layer of the UE 120 and to an application associated with a display of the UE 120, information to cause the indication 860 of the second RAT to be displayed by the UE 120. For example, the upper layer (such as the NAS layer or the data service layer) may report the second RAT to the application (such as an application processor) associated with the display or user interface of the UE 120 based at least in part on receiving or detecting the indication that the RACH procedure with the second base station 110 is successful. In some aspects, the upper layer may wait to receive or detect the indication that the RACH procedure with the second base station 110 is successful before transmitting the information to cause the indication 860 to be displayed by the UE 120 based at least in part on a bearer type associated with the second base station 110 indicating that the second base station 110 is an SCG. For example, as described in more detail herein, if the bearer type associated with the second base station 110 is an SCG bearer type or a split bearer type, then the upper layer may wait to receive or detect the indication that the RACH procedure with the second base station 110 is successful before transmitting the information to cause the indication 860 to be displayed by the UE 120. This may ensure that a RAT associated with an SCG is reported to be displayed by the UE 120 only if the connection with the SCG is stable (for example, if the RACH procedure is successfully completed or the UE 120 and the SCG (the second base station 110) are in an RRC connected state).

In some aspects, after causing the indication 860 to be displayed on the display or user interface of the UE 120, the UE 120 may detect a RACH failure associated with the second base station 110 (for example, may detect that a connection with the second base station 110 has been lost). In some aspects, the UE 120 may initiate a timer based at least in part on detecting the RACH failure. The UE 120 may determine whether another RACH procedure with the second base station 110 (in an attempt to re-establish the connection with the second base station 110) is successful (for example, in a similar manner as described elsewhere herein). If the UE 120 determines that another RACH procedure with the second base station 110 is not successfully completed prior to an expiration of the timer, then the UE 120 may transmit information to cause the indication 815 of the first RAT to be displayed by the UE 120. For example, the upper layer of the UE 120 may transmit information to cause the indication 815 of the first RAT to be displayed by the UE 120 based at least in part on an expiration of the timer prior to receiving another indication that a RACH procedure with the second base station 110 is successful. By initiating the timer, the UE 120 may be enabled to avoid a frequent display change for a RAT indication being displayed by the UE 120 caused by the RACH failure with the second base station 110. For example, the upper layer of the UE 120 may report the first RAT to be displayed only after a failure to successfully complete a RACH procedure prior to an expiration of the timer. This may ensure that the UE 120 does not frequently change between displaying the indication 815 and the indication 860.

In some other aspects, the UE 120 may determine a quantity of RACH failures associated with the second base station 110. For example, based at least in part on detecting the RACH failure associated with the second base station 110, the UE 120 may count or track a quantity of RACH failures (for example, a quantity of consecutive RACH failures) associated with the second base station 110. The UE 120 may determine whether the quantity of RACH failures satisfies a RACH failure threshold. If the quantity of RACH failures satisfies the RACH failure threshold, then the UE 120 may transmit information to cause the indication 815 of the first RAT to be displayed by the UE 120. For example, the upper layer of the UE 120 may transmit the transmit information to cause the indication 815 of the first RAT to be displayed by the UE 120 based at least in part on the quantity of RACH failures satisfying the RACH failure threshold. In some aspects, a value of the RACH failure threshold may be configured at the UE 120 (for example, in an OEM configuration). In some aspects, the UE 120 may initiate the timer, in a similar manner as described above, and may report the first RAT to be displayed based at least in part on the quantity of RACH failures satisfying the RACH failure threshold and the timer expiring. In some other aspects, the UE 120 may not initiate the timer and may report the first RAT to be displayed based at least in part on the quantity of RACH failures satisfying the RACH failure threshold.

By waiting to report the first RAT to be displayed until the quantity of RACH failures satisfies the RACH failure threshold, the UE 120 may be enabled to avoid a frequent display change for a RAT indication being displayed by the UE 120 caused by the RACH failure with the second base station 110. For example, the upper layer of the UE 120 may report the first RAT to be displayed only after the quantity of RACH failures satisfies the RACH failure threshold (rather than after the first RACH failure). This may ensure that the UE 120 does not frequently change between displaying the indication 815 and the indication 860.

As described in more detail herein, the described techniques can be used to stabilize a RAT indication displayed by the UE 120 in a dual connectivity mode. For example, the described techniques can be used to reduce a quantity of display changes for the RAT indication being displayed by the UE 120 in the dual connectivity mode when the UE 120 experiences a RACH failure with an SCG (such as a RACH failure with the second base station 110). This may conserve resources (such as processing resources) that would have otherwise been used associated with frequently reporting and changing a RAT icon being displayed by the UE 120 over a period of time. Additionally, this may improve a user perception of the UE 120 (for example, as frequent display changes for the RAT icon may result in a perception of poor performance).

Figure 9:
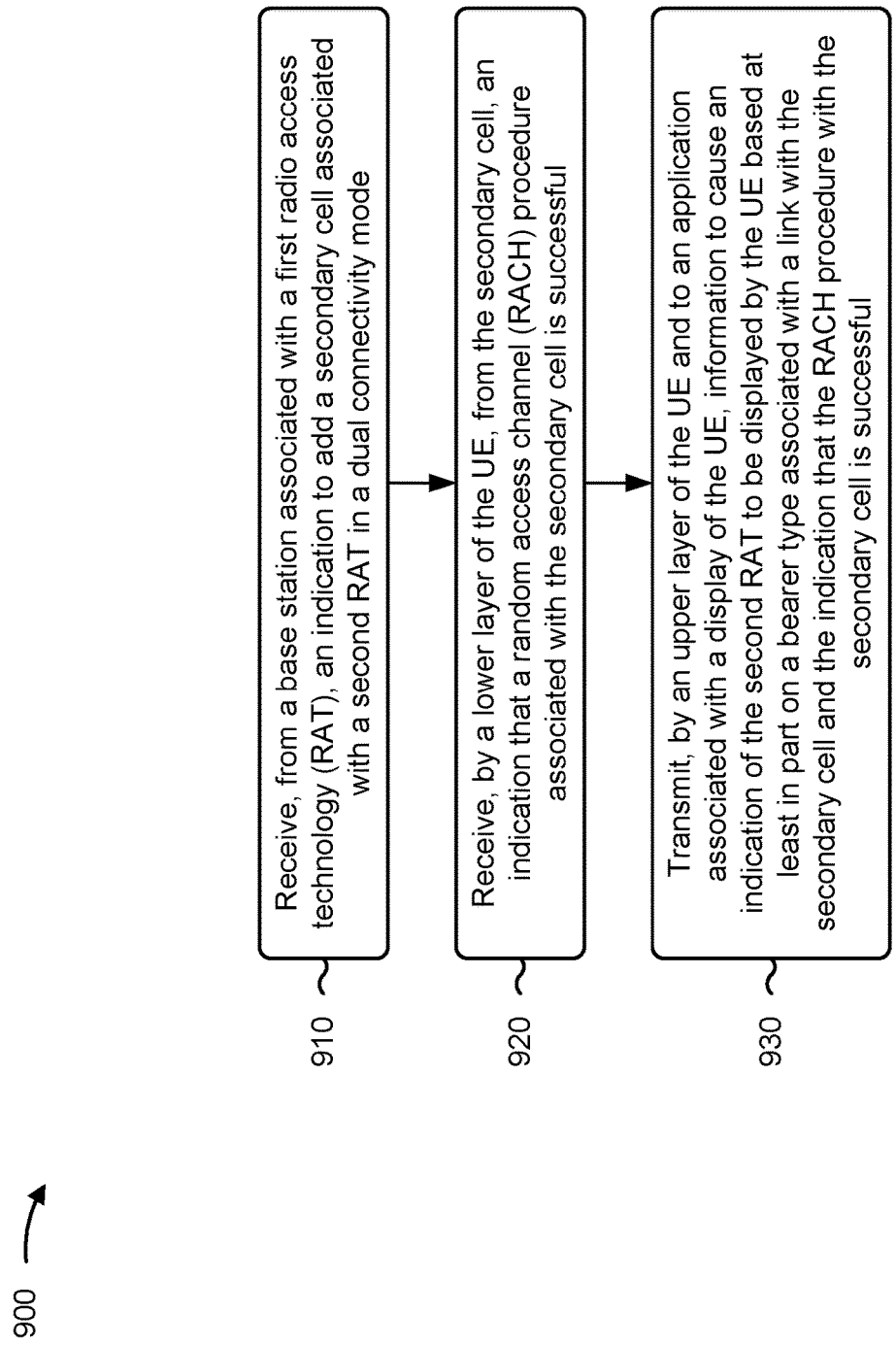
FIG. 9 is a flowchart illustrating an example process performed, for example, by a UE to support RACH procedure based RAT display indications, in accordance with the present disclosure.

FIG. 9 is a flowchart illustrating an example process 900 performed, for example, by a UE to support RACH procedure based RAT display indications, in accordance with the present disclosure. Example process 900 is an example where the UE (for example, UE 120) performs operations associated with RACH procedure based RAT display indications.

As shown in FIG. 9, in some aspects, process 900 may include receiving, from a base station associated with a first RAT, an indication to add a secondary cell associated with a second RAT in a dual connectivity mode (block 910). For example, the UE (such as by using reception component 1002, depicted in FIG. 10) may receive, from a base station associated with a first RAT, an indication to add a secondary cell associated with a second RAT in a dual connectivity mode, as described above.

As further shown in FIG. 9, in some aspects, process 900 may include receiving from the secondary cell, an indication that a RACH procedure associated with the secondary cell is successful (block 920). For example, the UE (such as by using reception component 1002, depicted in FIG. 10) may receive from the secondary cell an indication that a RACH procedure associated with the secondary cell is successful, as described above. In some aspects, the indication that a RACH procedure associated with the secondary cell is successful may be received by a lower layer of the UE.

As further shown in FIG. 9, in some aspects, process 900 may include transmitting, to an application associated with a display of the UE, information to cause an indication of the second RAT to be displayed by the UE based at least in part on a bearer type associated with a link with the secondary cell and the indication that the RACH procedure with the secondary cell is successful (block 930). For example, the UE (such as by using transmission component 1006, depicted in FIG. 10) may transmit, to an application associated with a display of the UE, information to cause an indication of the second RAT to be displayed by the UE based at least in part on a bearer type associated with a link with the secondary cell and the indication that the RACH procedure with the secondary cell is successful, as described above. In some aspects, an upper layer of the UE may transmit the information to cause an indication of the second RAT to be displayed by the UE to the application associated with the display of the UE.

Process 900 may include additional aspects, such as any single aspect or any combination of aspects described below or in connection with one or more other processes described elsewhere herein.

In a first additional aspect, process 900 includes displaying the indication of the second RAT on a user interface of the UE based at least in part on transmitting the information.

In a second additional aspect, alone or in combination with the first aspect, transmitting the information causes an icon associated with the second RAT to be displayed on a user interface of the UE.

In a third additional aspect, alone or in combination with one or more of the first and second aspects, the first RAT is an anchor RAT for the dual connectivity mode and the second RAT is a secondary RAT for the dual connectivity mode.

In a fourth additional aspect, alone or in combination with one or more of the first through third aspects, the dual connectivity mode is at least one of an ENDC mode, an NEDC) mode, or an NRDC mode.

In a fifth additional aspect, alone or in combination with one or more of the first through fourth aspects, process 900 includes detecting that a quantity of display changes between the first RAT and the second RAT in a time window satisfies a threshold, and transmitting the information to cause the indication of the second RAT to be displayed by the UE is further based at least in part on the quantity of display changes between the first RAT and the second RAT in the time window satisfying the threshold.

In a sixth additional aspect, alone or in combination with one or more of the first through fifth aspects, receiving the indication that the RACH procedure with the secondary cell is successful includes receiving an indication that a radio link with the secondary cell is active, and passing, from the lower layer to the upper layer, the indication that the RACH procedure with the secondary cell is successful based at least in part on receiving the indication that the radio link with the secondary cell is active.

In a seventh additional aspect, alone or in combination with one or more of the first through sixth aspects, receiving the indication that the RACH procedure with the secondary cell is successful includes receiving an indication that an RRC state with the secondary cell is a connected state, and passing, from the lower layer to the upper layer, the indication that the RACH procedure with the secondary cell is successful based at least in part on receiving the indication that the RRC state with the secondary cell is the connected state.

In an eighth additional aspect, alone or in combination with one or more of the first through seventh aspects, transmitting the information to cause the indication of the second RAT to be displayed by the UE is further based at least in part on passing, from the lower layer to the upper layer, the indication that the RACH procedure with the secondary cell is successful.

In a ninth additional aspect, alone or in combination with one or more of the first through eighth aspects, the lower layer is a MAC layer and the upper layer is a data service layer or a non-access stratum layer.

In a tenth additional aspect, alone or in combination with one or more of the first through ninth aspects, process 900 includes refraining from transmitting information to cause a RAT indication displayed by the UE to change from an indication of the first RAT to the indication of the second RAT until the upper layer of the UE receives the indication that the RACH procedure with the secondary cell is successful.

In an eleventh additional aspect, alone or in combination with one or more of the first through tenth aspects, the first RAT is a 4G RAT or an LTE RAT and the second RAT is a 5G RAT or an NR RAT.

In a twelfth additional aspect, alone or in combination with one or more of the first through eleventh aspects, the first RAT is associated with a first frequency band for a RAT and the second RAT is associated with a second frequency band for the RAT.

In a thirteenth additional aspect, alone or in combination with one or more of the first through twelfth aspects, process 900 includes measuring a signal associated with the secondary cell, and transmitting, to the base station, a measurement report indicating the measurement based at least in part on a value of the measurement satisfying a reporting event threshold for the dual connectivity mode, and receiving the indication to add the secondary cell associated with the second RAT is based at least in part on transmitting the measurement report.

In a fourteenth additional aspect, alone or in combination with one or more of the first through thirteenth aspects, transmitting the information to cause the indication of the second RAT to be displayed by the UE includes identifying that the bearer type associated with the link with the secondary cell is an SCG bearer or a split bearer, and transmitting the information to cause the indication of the second RAT to be displayed by the UE based at least in part on the bearer type being the SCG bearer or the split bearer and based at least in part on receiving the indication that the RACH procedure with the secondary cell is successful.

In a fifteenth additional aspect, alone or in combination with one or more of the first through fourteenth aspects, process 900 includes detecting a RACH failure associated with the secondary cell, initiating a timer based at least in part on identifying the RACH failure, and transmitting information to cause an indication of the first RAT to be displayed by the UE based at least in part on an expiration of the timer prior to receiving another indication that a RACH procedure with the secondary cell is successful.

In a sixteenth additional aspect, alone or in combination with one or more of the first through fifteenth aspects, process 900 includes transmitting information to cause an indication of the first RAT to be displayed by the UE based at least in part on a quantity of RACH failures associated with the secondary cell satisfying a RACH failure threshold.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
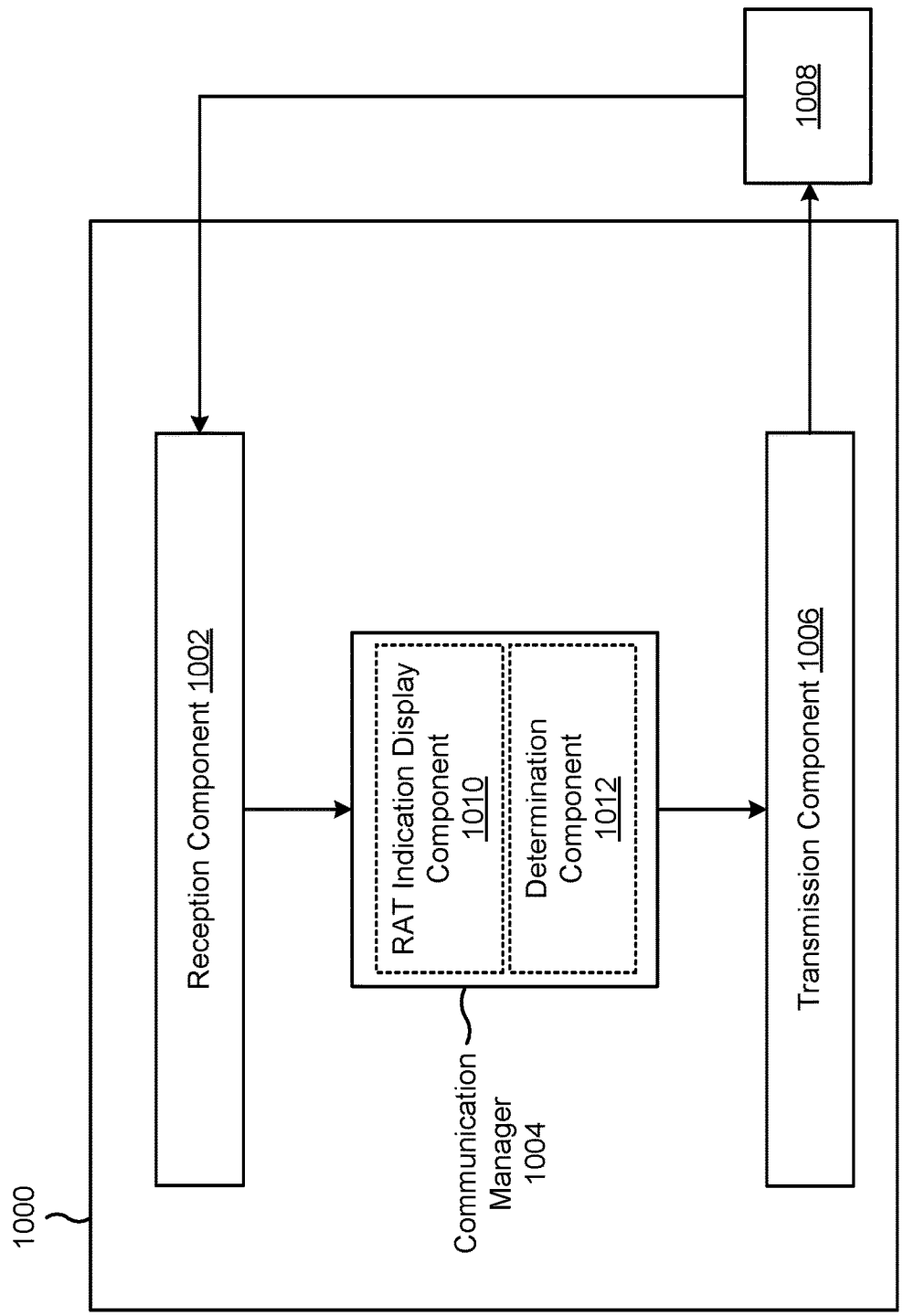
FIG. 10 is a block diagram of an example apparatus for wireless communication to support RACH procedure based RAT display indications, in accordance with the present disclosure.

FIG. 10 is a block diagram of an example apparatus 1000 for wireless communication to support RACH procedure based RAT display indications, in accordance with the present disclosure. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIG. 8. Additionally or alternatively, the apparatus 1000 may be configured to perform one or more processes described herein, such as process 900 of FIG. 9, or a combination thereof. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be co-located with the reception component 1002 in a transceiver.

The communication manager 1004 may receive or may cause the reception component 1002 to receive, from a base station associated with a first RAT, an indication to add a secondary cell associated with a second RAT in a dual connectivity mode. The communication manager 1004 may receive or may cause the reception component 1002 to receive from the secondary cell, an indication that a RACH procedure associated with the secondary cell is successful. The communication manager 1004 may transmit or may cause the transmission component 1006 to transmit, to an application associated with a display of the UE, information to cause an indication of the second RAT to be displayed by the UE based at least in part on a bearer type associated with a link with the secondary cell and the indication that the RACH procedure with the secondary cell is successful. In some aspects, the communication manager 1004 may perform one or more operations described elsewhere herein as being performed by one or more components of the communication manager 1004.

The communication manager 1004 may include a controller/processor, a memory, or a combination thereof, of the UE described above in connection with FIG. 2. In some aspects, the communication manager 1004 includes a set of components, such as a RAT indication display component 1010, a determination component 1012, or a combination thereof. Alternatively, the set of components may be separate and distinct from the communication manager 1004. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a base station associated with a first RAT, an indication to add a secondary cell associated with a second RAT in a dual connectivity mode. The reception component 1002 may receive from the secondary cell, an indication that a RACH procedure associated with the secondary cell is successful. The transmission component 1006 may transmit, to an application associated with a display of the UE, information to cause an indication of the second RAT to be displayed by the UE based at least in part on a bearer type associated with a link with the secondary cell and the indication that the RACH procedure with the secondary cell is successful.

The RAT indication display component 1010 may display the indication of the second RAT on a user interface of the UE based at least in part on transmitting the information.

The determination component 1012 may detect that a quantity of display changes between the first RAT and the second RAT in a time window satisfies a threshold where transmitting the information to cause the indication of the second RAT to be displayed by the UE is further based at least in part on the quantity of display changes between the first RAT and the second RAT in the time window satisfying the threshold.

The determination component 1012 may refrain from transmitting information to cause a RAT indication displayed by the UE to change from an indication of the first RAT to the indication of the second RAT until the upper layer of the UE receives the indication that the RACH procedure with the secondary cell is successful.

The reception component 1002 or the determination component 1012 may measure a signal associated with the secondary cell.

The transmission component 1006 may transmit, to the base station, a measurement report indicating the measurement based at least in part on a value of the measurement satisfying a reporting event threshold for the dual connectivity mode where receiving the indication to add the secondary cell associated with the second RAT is based at least in part on transmitting the measurement report.

The determination component 1012 may detect a RACH failure associated with the secondary cell. The determination component 1012 may initiate a timer based at least in part on identifying the RACH failure. The transmission component 1006 may transmit information to cause an indication of the first RAT to be displayed by the UE based at least in part on an expiration of the timer prior to receiving another indication that a RACH procedure with the secondary cell is successful.

The transmission component 1006 may transmit information to cause an indication of the first RAT to be displayed by the UE based at least in part on a quantity of RACH failures associated with the secondary cell satisfying a RACH failure threshold.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station associated with a first radio access technology (RAT), an indication to add a secondary cell associated with a second RAT in a dual connectivity mode; receiving, by a lower layer of the UE, from the secondary cell, an indication that a random access channel (RACH) procedure associated with the secondary cell is successful; and transmitting, by an upper layer of the UE and to an application associated with a display of the UE, information to cause an indication of the second RAT to be displayed by the UE based at least in part on a bearer type associated with a link with the secondary cell and the indication that the RACH procedure with the secondary cell is successful.

Aspect 2: The method of Aspect 1, further comprising displaying the indication of the second RAT on a user interface of the UE based at least in part on transmitting the information.

Aspect 3: The method of any of Aspects 1-2, wherein transmitting the information causes an icon associated with the second RAT to be displayed on a user interface of the UE.

Aspect 4: The method of any of Aspects 1-3, wherein the first RAT is an anchor RAT for the dual connectivity mode and the second RAT is a secondary RAT for the dual connectivity mode.

Aspect 5: The method of any of Aspects 1-4, wherein the dual connectivity mode is at least one of: an Evolved Universal Mobile Telecommunications System Terrestrial Radio Access (E-UTRA)-NR dual connectivity (ENDC) mode, a New Radio (NR) E-UTRA dual connectivity (NEDC) mode, or an NR dual connectivity (NRDC) mode.

Aspect 6: The method of any of Aspects 1-5, further comprising detecting that a quantity of display changes between the first RAT and the second RAT in a time window satisfies a threshold, wherein transmitting the information to cause the indication of the second RAT to be displayed by the UE is further based at least in part on the quantity of display changes between the first RAT and the second RAT in the time window satisfying the threshold.

Aspect 7: The method of any of Aspects 1-6, wherein receiving the indication that the RACH procedure with the secondary cell is successful comprises: receiving, by the lower layer, an indication that a radio link with the secondary cell is active; and passing, from the lower layer to the upper layer, the indication that the RACH procedure with the secondary cell is successful based at least in part on receiving the indication that the radio link with the secondary cell is active.

Aspect 8: The method of any of Aspects 1-7, wherein receiving the indication that the RACH procedure with the secondary cell is successful comprises: receiving, by the lower layer, an indication that a radio resource control (RRC) state with the secondary cell is a connected state; and passing, from the lower layer to the upper layer, the indication that the RACH procedure with the secondary cell is successful based at least in part on receiving the indication that the RRC state with the secondary cell is the connected state.

Aspect 9: The method of any of Aspects 1-8, wherein transmitting the information to cause the indication of the second RAT to be displayed by the UE is further based at least in part on passing, from the lower layer to the upper layer, the indication that the RACH procedure with the secondary cell is successful.

Aspect 10: The method of any of Aspects 1-9, wherein the lower layer is a medium access control (MAC) layer and the upper layer is a data service layer or a non-access stratum layer.

Aspect 11: The method of any of Aspects 1-10, further comprising refraining from transmitting information to cause a RAT indication displayed by the UE to change from an indication of the first RAT to the indication of the second RAT until the upper layer of the UE receives the indication that the RACH procedure with the secondary cell is successful.

Aspect 12: The method of any of Aspects 1-11, wherein the first RAT is a 4G RAT or a Long Term Evolution (LTE) RAT and the second RAT is a 5G RAT or a New Radio (NR) RAT.

Aspect 13: The method of any of Aspects 1-12, wherein the first RAT is associated with a first frequency band for a RAT and the second RAT is associated with a second frequency band for the RAT.

Aspect 14: The method of any of Aspects 1-13, further comprising: measuring a signal associated with the secondary cell; and transmitting, to the base station, a measurement report indicating the measurement based at least in part on a value of the measurement satisfying a reporting event threshold for the dual connectivity mode, wherein receiving the indication to add the secondary cell associated with the second RAT is based at least in part on transmitting the measurement report.

Aspect 15: The method of any of Aspects 1-14, wherein transmitting the information to cause the indication of the second RAT to be displayed by the UE comprises: identifying that the bearer type associated with the link with the secondary cell is a secondary cell group (SCG) bearer or a split bearer; and transmitting the information to cause the indication of the second RAT to be displayed by the UE based at least in part on the bearer type being the SCG bearer or the split bearer and based at least in part on receiving the indication that the RACH procedure with the secondary cell is successful.

Aspect 16: The method of any of Aspects 1-15, further comprising: detecting a RACH failure associated with the secondary cell; initiating a timer based at least in part on identifying the RACH failure; and transmitting information to cause an indication of the first RAT to be displayed by the UE based at least in part on an expiration of the timer prior to receiving another indication that a RACH procedure with the secondary cell is successful.

Aspect 17: The method of any of Aspects 1-16, further comprising transmitting information to cause an indication of the first RAT to be displayed by the UE based at least in part on a quantity of RACH failures associated with the secondary cell satisfying a RACH failure threshold.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one processor; and
   at least one memory communicatively coupled with the at least one processor and storing processor-readable code that, when executed by the at least one processor, is configured to cause the UE to:
   receive, from a base station associated with a first radio access technology (RAT), an indication to add a secondary cell associated with a second RAT in a dual connectivity mode;
   receive, by a lower layer of the UE from the secondary cell, an indication that a random access channel (RACH) procedure associated with the secondary cell is successful; and
   transmit, by an upper layer of the UE to an application associated with a display of the UE, information to cause an indication of the second RAT to be displayed by the UE based at least in part on a bearer type associated with a link with the secondary cell and the indication that the RACH procedure with the secondary cell is successful.

2. The UE of claim 1, wherein the processor readable code, when executed by the at least one processor, is further configured to cause the UE to display the indication of the second RAT on a user interface of the UE based at least in part on transmitting the information.

3. The UE of claim 1, wherein transmitting the information causes an icon associated with the second RAT to be displayed on a user interface of the UE.

4. The UE of claim 1, wherein the first RAT is an anchor RAT for the dual connectivity mode and the second RAT is a secondary RAT for the dual connectivity mode.

5. The UE of claim 1, wherein the dual connectivity mode is at least one of:
   an Evolved Universal Mobile Telecommunications System Terrestrial Radio Access (E-UTRA)-NR dual connectivity (ENDC) mode,
   a New Radio (NR) E-UTRA dual connectivity (NEDC) mode, or
   an NR dual connectivity (NRDC) mode.

6. The UE of claim 1, wherein the processor readable code, when executed by the at least one processor, is further configured to cause the UE to detect that a quantity of display changes between the first RAT and the second RAT in a time window satisfies a threshold,
   wherein transmitting the information to cause the indication of the second RAT to be displayed by the UE is further based at least in part on the quantity of display changes between the first RAT and the second RAT in the time window satisfying the threshold.

7. The UE of claim 1, wherein, to cause the UE to receive the indication that the RACH procedure with the secondary cell is successful, the processor readable code, when executed by the at least one processor, is configured to cause the UE to:
   receive an indication that a radio link with the secondary cell is active; and
   pass, from the lower layer to the upper layer, the indication that the RACH procedure with the secondary cell is successful based at least in part on receiving the indication that the radio link with the secondary cell is active.

8. The UE of claim 1, wherein, to cause the UE to receive the indication that the RACH procedure with the secondary cell is successful, the processor readable code, when executed by the at least one processor, is configured to cause the UE to:
   receive an indication that a radio resource control (RRC) state with the secondary cell is a connected state; and
   pass, from the lower layer to the upper layer, the indication that the RACH procedure with the secondary cell is successful based at least in part on receiving the indication that the RRC state with the secondary cell is the connected state.

9. The UE of claim 1 wherein transmitting the information to cause the indication of the second RAT to be displayed by the UE is further based at least in part on passing, from the lower layer to the upper layer, the indication that the RACH procedure with the secondary cell is successful.

10. The UE of claim 1, wherein the lower layer is a medium access control (MAC) layer and the upper layer is a data service layer or a non-access stratum layer.

11. The UE of claim 1, wherein the processor readable code, when executed by the at least one processor, is further configured to cause the UE to refrain from transmitting information to cause a RAT indication displayed by the UE to change from an indication of the first RAT to the indication of the second RAT until the upper layer of the UE receives the indication that the RACH procedure with the secondary cell is successful.

12. The UE of claim 1, wherein processor readable code, when executed by the at least one processor, is further configured to cause the UE to:
measure a signal associated with the secondary cell; and
transmit, to the base station, a measurement report indicating the measurement based at least in part on a value of the measurement satisfying a reporting event threshold for the dual connectivity mode, wherein receiving the indication to add the secondary cell associated with the second RAT is based at least in part on transmitting the measurement report.

13. The UE of claim 1, wherein, to cause the UE to transmit the information to cause the indication of the second RAT to be displayed by the UE, the processor readable code, when executed by the at least one processor, is configured to cause the UE to:
identify that the bearer type associated with the link with the secondary cell is a secondary cell group (SCG) bearer or a split bearer; and
transmit the information to cause the indication of the second RAT to be displayed by the UE based at least in part on the bearer type being the SCG bearer or the split bearer and based at least in part on receiving the indication that the RACH procedure with the secondary cell is successful.

14. The UE of claim 1, wherein the processor readable code, when executed by the at least one processor, is further configured to cause the UE to:
detect a RACH failure associated with the secondary cell;
initiate a timer based at least in part on identifying the RACH failure; and
transmit information to cause an indication of the first RAT to be displayed by the UE based at least in part on an expiration of the timer prior to receiving another indication that a RACH procedure with the secondary cell is successful.

15. The UE of claim 1, wherein processor readable code, when executed by the at least one processor, is further configured to cause the UE to transmit information to cause an indication of the first RAT to be displayed by the UE based at least in part on a quantity of RACH failures associated with the secondary cell satisfying a RACH failure threshold.

16. A method of wireless communication performed by a user equipment (UE), comprising:

receiving, from a base station associated with a first radio access technology (RAT), an indication to add a secondary cell associated with a second RAT in a dual connectivity mode;
receiving, by a lower layer of the UE, from the secondary cell, an indication that a random access channel (RACH) procedure associated with the secondary cell is successful; and
transmitting, by an upper layer of the UE and to an application associated with a display of the UE, information to cause an indication of the second RAT to be displayed by the UE based at least in part on a bearer type associated with a link with the secondary cell and the indication that the RACH procedure with the secondary cell is successful.

17. The method of claim 16, further comprising displaying the indication of the second RAT on a user interface of the UE based at least in part on transmitting the information.

18. The method of claim 16, wherein transmitting the information causes an icon associated with the second RAT to be displayed on a user interface of the UE.

19. The method of claim 16, wherein the first RAT is an anchor RAT for the dual connectivity mode and the second RAT is a secondary RAT for the dual connectivity mode.

20. The method of claim 16, wherein the dual connectivity mode is at least one of:
an Evolved Universal Mobile Telecommunications System Terrestrial Radio Access (E-UTRA)-NR dual connectivity (ENDC) mode,
a New Radio (NR) E-UTRA dual connectivity (NEDC) mode, or
an NR dual connectivity (NRDC) mode.

21. The method of claim 16, further comprising detecting that a quantity of display changes between the first RAT and the second RAT in a time window satisfies a threshold,
wherein transmitting the information to cause the indication of the second RAT to be displayed by the UE is further based at least in part on the quantity of display changes between the first RAT and the second RAT in the time window satisfying the threshold.

22. The method of claim 16, wherein receiving the indication that the RACH procedure with the secondary cell is successful comprises:
receiving, by the lower layer, an indication that a radio link with the secondary cell is active; and
passing, from the lower layer to the upper layer, the indication that the RACH procedure with the secondary cell is successful based at least in part on receiving the indication that the radio link with the secondary cell is active.

23. The method of claim 16, wherein receiving the indication that the RACH procedure with the secondary cell is successful comprises:
receiving, by the lower layer, an indication that a radio resource control (RRC) state with the secondary cell is a connected state; and
passing, from the lower layer to the upper layer, the indication that the RACH procedure with the secondary cell is successful based at least in part on receiving the indication that the RRC state with the secondary cell is the connected state.

24. The method of claim 16, wherein transmitting the information to cause the indication of the second RAT to be displayed by the UE is further based at least in part on passing, from the lower layer to the upper layer, the indication that the RACH procedure with the secondary cell is successful.

25. The method of claim 16, wherein the lower layer is a medium access control (MAC) layer and the upper layer is a data service layer or a non-access stratum layer.

26. The method of claim 16, further comprising refraining from transmitting information to cause a RAT indication displayed by the UE to change from an indication of the first RAT to the indication of the second RAT until the upper layer of the UE receives the indication that the RACH procedure with the secondary cell is successful.

27. The method of claim 16, further comprising:
measuring a signal associated with the secondary cell; and
transmitting, to the base station, a measurement report indicating the measurement based at least in part on a value of the measurement satisfying a reporting event threshold for the dual connectivity mode,
wherein receiving the indication to add the secondary cell associated with the second RAT is based at least in part on transmitting the measurement report.

28. The method of claim 16, wherein transmitting the information to cause the indication of the second RAT to be displayed by the UE comprises:
identifying that the bearer type associated with the link with the secondary cell is a secondary cell group (SCG) bearer or a split bearer; and
transmitting the information to cause the indication of the second RAT to be displayed by the UE based at least in part on the bearer type being the SCG bearer or the split bearer and based at least in part on receiving the indication that the RACH procedure with the secondary cell is successful.

29. The method of claim 16, further comprising:
detecting a RACH failure associated with the secondary cell;
initiating a timer based at least in part on identifying the RACH failure; and
transmitting information to cause an indication of the first RAT to be displayed by the UE based at least in part on an expiration of the timer prior to receiving another indication that a RACH procedure with the secondary cell is successful.

30. The method of claim 16, further comprising transmitting information to cause an indication of the first RAT to be displayed by the UE based at least in part on a quantity of RACH failures associated with the secondary cell satisfying a RACH failure threshold.

* * * * *